(12) United States Patent
Nishiyama et al.

(10) Patent No.: US 11,086,127 B2
(45) Date of Patent: Aug. 10, 2021

(54) OPTICAL APPARATUS

(71) Applicant: ColorLink Japan, Ltd., Niigata (JP)

(72) Inventors: Miho Nishiyama, Tokyo (JP); Takuya Komatsu, Tochigi (JP)

(73) Assignee: ColorLink Japan, Ltd., Niigata (JP)

( * ) Notice: Subject to any disclaimer, the term of this patent is extended or adjusted under 35 U.S.C. 154(b) by 269 days.

(21) Appl. No.: 16/134,881

(22) Filed: Sep. 18, 2018

(65) Prior Publication Data

US 2019/0018248 A1 Jan. 17, 2019

Related U.S. Application Data

(63) Continuation of application No. PCT/JP2018/000727, filed on Jan. 12, 2018.

(51) Int. Cl.
*G02B 27/01* (2006.01)
*G02B 5/30* (2006.01)
(Continued)

(52) U.S. Cl.
CPC .......... *G02B 27/0172* (2013.01); *G02B 5/30* (2013.01); *G02B 5/3025* (2013.01);
(Continued)

(58) Field of Classification Search
CPC ...... G02B 27/0172; G02B 27/02; G02B 5/30; G02B 5/32; G02B 5/3025; G02B 5/3083; G02B 2027/0178; G02B 2027/0174; G02B 27/017; G02B 27/0905; G02B 27/28; G02B 27/01; G02B 27/0103
(Continued)

(56) References Cited

U.S. PATENT DOCUMENTS 6,075,651 A 6/2000 Hoppe
6,563,638 B2 * 5/2003 King ..................... G02B 13/14
349/11
(Continued)

FOREIGN PATENT DOCUMENTS

JP 2005316304 A 11/2005
JP 2007094175 A 4/2007
(Continued)

OTHER PUBLICATIONS

International Search Report for International Patent Application No. PCT/JP2018/000727, issued by the Japan Patent Office dated Mar. 27, 2018.
(Continued)

*Primary Examiner* — Jade R Chwasz

(57) ABSTRACT

Optical apparatuses used for so-called immersive virtual reality (VR), as it is, can not be used for augmented reality (AR) that overlays external light and images. An optical apparatus to overlay image light on external light and guide resultant light in a downstream side, including: an image optical system including an optical element having lens power with respect to at least the image light; and a reflecting element to overlay, by reflecting at least part of the image light, the at least part of the image light and the at least part of the external light, wherein the image optical system has a GPH element having inverse dispersibility that is inverse to the wavelength dispersibility of the optical element.

14 Claims, 20 Drawing Sheets

(51) Int. Cl.
 *G02B 27/02* (2006.01)
 *G02B 5/32* (2006.01)
(52) U.S. Cl.
 CPC ............. *G02B 5/3083* (2013.01); *G02B 5/32* (2013.01); *G02B 27/02* (2013.01); *G02B 2027/0174* (2013.01); *G02B 2027/0178* (2013.01)
(58) Field of Classification Search
 USPC .................................. 359/630, 15, 14, 9, 633
 See application file for complete search history.

(56) References Cited

U.S. PATENT DOCUMENTS

| | | | |
|---|---|---|---|
| 9,465,215 B2 * | 10/2016 | Richards | G02B 27/0103 |
| 10,732,461 B2 | 8/2020 | Yoshida | |
| 2007/0070504 A1 | 3/2007 | Akutsu | |
| 2016/0011353 A1 * | 1/2016 | Escuti | G02B 5/3083 359/15 |
| 2018/0129018 A1 * | 5/2018 | Cheng | G02B 27/286 |
| 2018/0210222 A1 * | 7/2018 | Seo | G02B 27/283 |
| 2020/0319468 A1 | 10/2020 | Kobayashi | |

FOREIGN PATENT DOCUMENTS

| | | |
|---|---|---|
| JP | 2018205448 A | 12/2018 |
| JP | 2019082531 A | 5/2019 |

OTHER PUBLICATIONS

Escuti, J. Michael et al., "Geometric-Phase Holograms", Optics & Photonics News, Feb. 2016, pp. 24-29.

Circumstances explanation concerning early examination in reference to Application No. PCT/JP2018/000727 filed on Jul. 6, 2018.

* cited by examiner

OPTICAL APPARATUS

The contents of the following International patent application are incorporated herein by reference:
NO. PCT/JP2018/000727 filed on Jan. 12, 2018.

BACKGROUND

1. Technical Field

The present invention relates to an optical apparatus.

2. Related Art

There are optical apparatuses that are worn by users and guide images to eyes of the users (refer to U.S. Pat. No. 6,075,651, for example).

However, the optical apparatus described above is used for so-called immersive virtual reality (VR), which does not let external light in the real world pass through. Thus, it cannot be used, as it is, for augmented reality (AR), which overlay external light and images.

SUMMARY

Therefore, it is an object of an aspect of the innovations herein to provide an optical apparatus, which are capable of overcoming the above drawbacks accompanying the related art. The above and other objects can be achieved by combinations described in the claims. That is, in the first aspect of the present invention, an optical apparatus to overlay image light on external light and guide resultant light in a downstream side includes: an image optical system including an optical element having lens power with respect to at least the image light; and a reflecting element to overlay, by reflecting at least part of the image light, the at least part of the image light and the at least part of the external light, wherein the image optical system has a GPH element have inverse dispersibility, the inverse dispersibility being opposite to wavelength dispersibility of the optical element.

The summary clause does not necessarily describe all necessary features of the embodiments of the present invention. The present invention may also be a sub-combination of the features described above.

DESCRIPTION OF EXEMPLARY EMBODIMENTS

The embodiments do not limit the invention according to the claims, and all the combinations of the features described in the embodiments are not necessarily essential to means provided by aspects of the invention.

Figure 1:
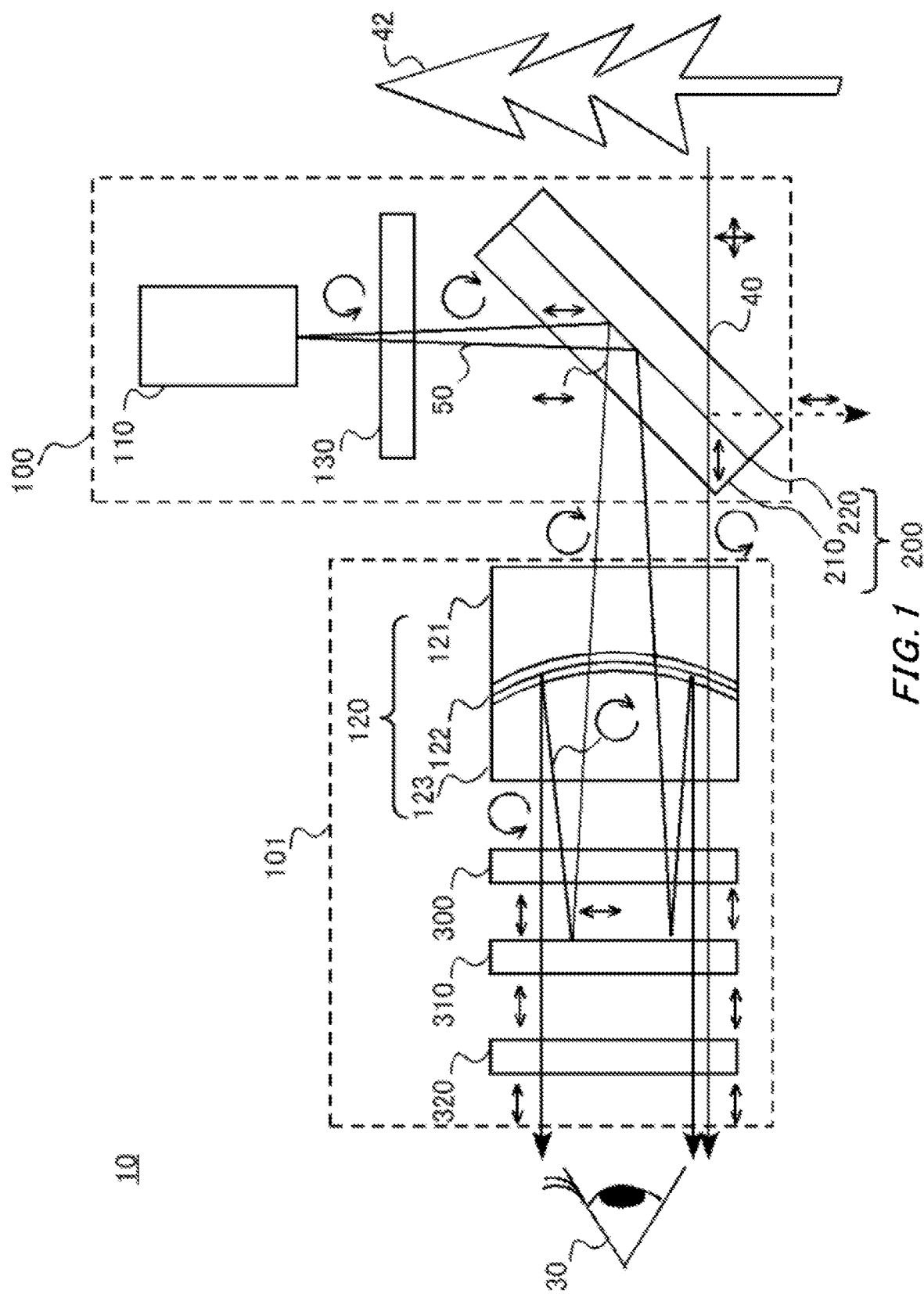
FIG. 1 is a schematic diagram illustrating an optical configuration of an optical apparatus 10.

FIG. 1 is a schematic diagram illustrating an optical configuration of an optical apparatus 10 according to the present embodiment. The optical apparatus 10 overlays image light 50 on external light 40 in the real world, and guides the resultant light to eyes of a user 30. The optical apparatus 10 is used for visual augmented reality (AR), for example.

The optical apparatus 10 includes an image overlay unit 100 to overlay the image light 50 on the external light 40, and an optical system 101 that is provided in the downstream side of the image overlay unit 100 in a traveling direction of the image light 50. The image overlay unit 100 has a projector 110, a GPH element 130 and a reflecting element 200, in this order from the upstream side. The optical system 101 has a reflection type doublet 120, a λ/4 plate 300, a reflection type polarizing plate 310, and a polarizing plate 320, in this order from the upstream side.

The reflecting element 200 has a retarder 210, and a reflection type polarizing plate 220 that is stacked up in the downstream side of the retarder 210. Also, the reflection type doublet 120 has a pair of doublet pieces 121, 123 which fit each other via a curved surface 122.

Figure 2:
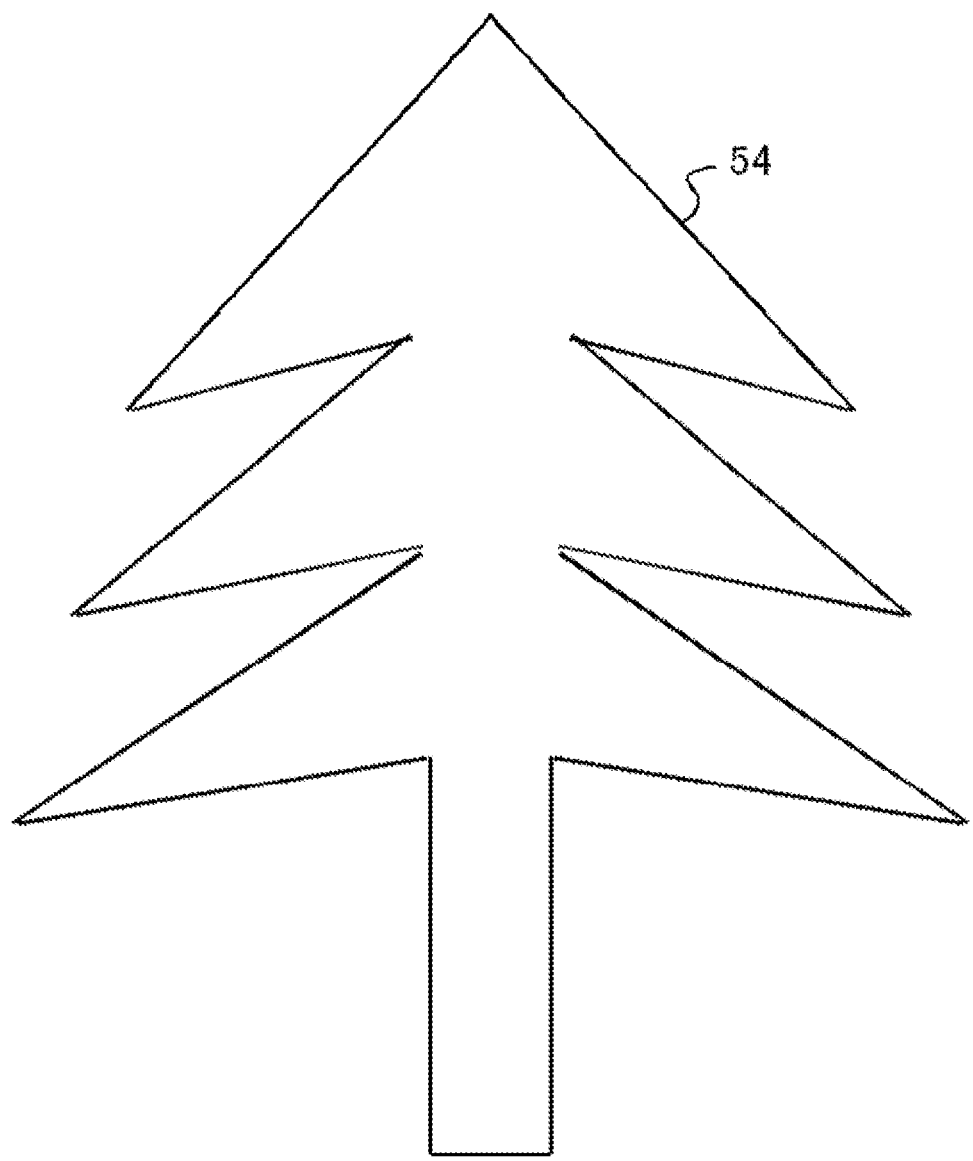
FIG. 2 shows an exemplary object image 54 of a real object 42 that is part of external light 40.
Figure 3:
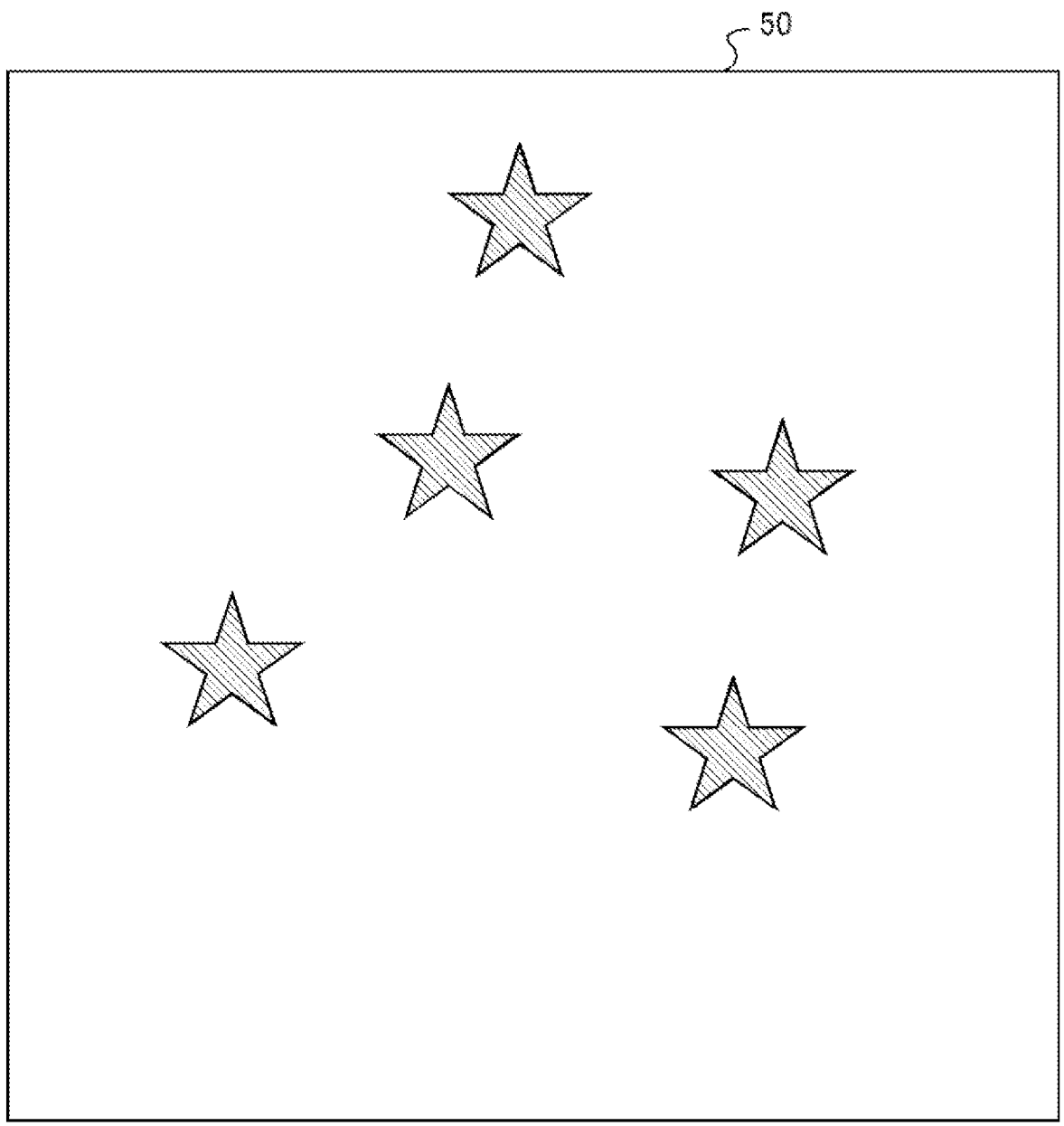
FIG. 3 shows exemplary image light 50.
Figure 4:
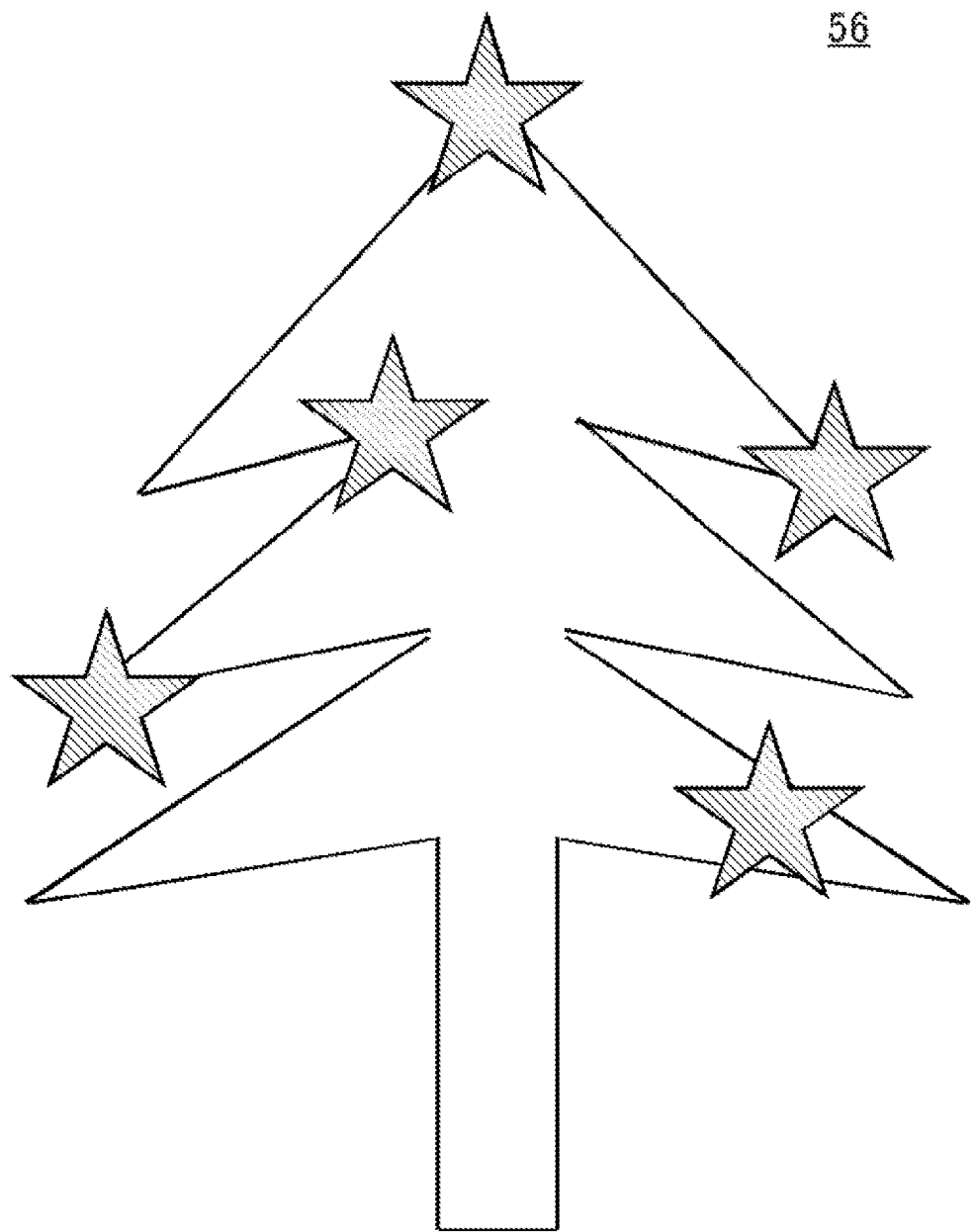
FIG. 4 shows an exemplary overlaid image 56 that is guided by the optical apparatus 10 to eyes of the user 30.

FIGS. 2 to 4 are schematic diagrams illustrating images to be seen by the eyes of the user 30 using the optical apparatus 10. First, FIG. 2 shows an exemplary object image 54 of a real object 42 that is part of the external light 40. The object image 54 can also be described as an image to be seen by the eyes of the user 30 when the optical apparatus 10 is not used.

FIG. 3 shows exemplary image light 50. The image light 50 is an image that is generated in the projector 110, which is a so-called virtual image. The image light 50 may be a still picture or a video, and may be any visual content such as a drawing, photo, and text.

FIG. 4 shows an exemplary overlaid image 56 that is guided by the optical apparatus 10 to the eyes of the user 30. In the overlaid image 56, on the object image 54, an image formed by the image light 50 is overlaid. Thereby, visual augmented reality is achieved. In this case, the object image 54 is an image of the real object 42, and thus it is preferably guided to the eyes of the user 30 in the same state as that when the optical apparatus 10 is not used. That is, preferably, the object image 54, even if it passes through the optical apparatus 10, is not optically enlarged, reduced, or distorted, etc.

Means for the optical apparatus 10 in FIG. 1 to guide the overlaid image 56 to the eyes of the user 30 is further described. In FIG. 1, the directions of polarization of the image light 50 and the external light 40 are illustrated. The directions of polarization illustrated in FIG. 1 show loci of the vibration of the electric field seen from a direction which a ray comes from while keeping the up and down relationship of the sheet of paper.

The external light 40 is often unpolarized. When the external light 40 that is unpolarized enters the reflection type polarizing plate 220, the reflection type polarizing plate 220 reflects one of linearly polarized lights that are orthogonal to each other, and transmits the other linearly polarized light. In the example in FIG. 1, the reflection type polarizing plate 220 reflects the linearly polarized light in the vertical direction, and transmits the linearly polarized light in the horizontal direction. Furthermore, the reflecting surface of the reflection type polarizing plate 220 is inclined by 45° relative to the straight line from the external light 40 to the eyes 30. Thus, the linearly polarized light in the vertical direction is reflected in a direction orthogonal to the straight line from the external light 40 to the eyes 30.

The external light 40 that is transmitted through the reflection type polarizing plate 220 is modulated in the direction of polarization through the retarder 210. In FIG. 1, the retarder 210 is a λ/4 plate. Thus, through the retarder 210, it is modulated from the linearly polarized light in the horizontal direction into circularly polarized light that is left-handed (or may be referred to as counterclockwise). The external light 40 that is left-handed circularly polarized enters the reflection type doublet 120.

The curved surface 122 between the pair of the doublet pieces 121, 123 of the reflection type doublet 120 has a function as a half mirror to, regardless of the direction of polarization, reflect the half the strength of the entering light and transmit the remaining half. Thus, the external light 40 being left-handed circularly polarized light having entered the reflection type doublet 120 keeps the polarization state thereof unchanged and is transmitted at a half the strength. The remaining half is reflected to the upstream side, and thus not guided to the eyes 30.

The pair of the doublet pieces 121, 123 have refractive indexes that coincide each other within a predetermined range. For example, the pair of the doublet pieces 121, 123 are formed of the same material, and their refractive indexes coincide each other within a tolerance range which is mainly attributable to impurities etc. Thus, no refraction occurs before and after the external light 40 is transmitted through the curved surface 122, and the external light 40 receives no lens effect from the reflection type doublet 120. That is, in the reflection type doublet 120, the external light 40 is not optically enlarged, reduced, or distorted, etc.

The external light 40 transmitted through the reflection type doublet 120 enters the λ/4 plate 300. By the λ/4 plate 300, the external light 40 being left-handed circularly polarized light is modulated into linearly polarized light in the horizontal direction.

The external light 40 being the linearly polarized light in the horizontal direction enters the reflection type polarizing plate 310. The reflection type polarizing plate 310 reflects one of linearly polarized lights that are orthogonal to each other, and transmits the other linearly polarized light. In the example in FIG. 1, the reflection type polarizing plate 310 reflects the linearly polarized light in the vertical direction, and transmits the linearly polarized light in the horizontal direction. Thus, the external light 40 being the linearly polarized light in the horizontal direction keeps the direction of polarization thereof unchanged and is transmitted through the reflection type polarizing plate 310.

The external light 40 transmitted through the reflection type polarizing plate 310 enter the polarizing plate 320. The polarizing plate 320 absorbs one of linearly polarized lights that are orthogonal to each other, and transmits the other. In the example in FIG. 1, the polarizing plate 320 absorbs the linearly polarized light in the vertical direction, and transmits the linearly polarized light in the horizontal direction. Thus, the external light 40 being the linearly polarized light in the horizontal direction is transmitted through the polarizing plate 320 and enters the eyes 30.

The image light 50 is generated in the projector 110. The projector 110 is configured of, for example, light sources, liquid crystal panels, etc., and outputs color image light 50, which consists of the three colors: red, green, and blue. Each color of the image light 50 may be time-divided and output, or may be overlaid on each other or space-divided per pixel and output at the same time. Furthermore, the projector 110 outputs the image light 50 as left-handed circularly polarized light.

The image light 50 output from the projector 110 enters the GPH element 130. While inverting the direction of polarization of the entered circularly polarized light, the GPH element 130 provides the lens effect on the entering light using the diffraction phenomenon. Thus, the image light 50 being the left-handed circularly polarized light that has entered the GPH element 130 is modulated into circularly polarized light that is right-handed (or may be referred to as clockwise) while receiving the lens effect. The GPH element 130 is further described later.

The image light 50 transmitted through the GPH element 130 enters the retarder 210 of the reflecting element 200. The retarder 210 has functions as the λ/4 plate, and thus the image light 50 being right-handed circularly polarized light is modulated into the linearly polarized light in the vertical direction. The image light 50 being the linearly polarized light in the vertical direction is reflected on the reflection type polarizing plate 220. Thereby, the image light 50 is directed to the eyes 30 and, as a result, overlaid on the external light 40. Furthermore, the reflected image light 50 enters the retarder 210 again, and thus the image light 50 being the linearly polarized light in the vertical direction is modulated into right-handed circularly polarized light.

The image light 50 transmitted through the retarder 210 enters the reflection type doublet 120. Like the external light 40, half part of the strength of the image light 50 is transmitted through the reflection type doublet 120, without receiving any modulation in the polarization state and, without receiving any effect such as being optically enlarged, reduced, or distorted, etc., either. The remaining half is reflected to the upstream side, and thus not guided to the eyes 30.

The image light 50 transmitted through the reflection type doublet 120 enters the λ/4 plate 300. The image light 50 entering the λ/4 plate 300 is right-handed circularly polarized light, and thus, it is modulated into linearly polarized light in the vertical direction when passing through the λ/4 plate 300.

The image light 50 being the linearly polarized light in the vertical direction enters the reflection type polarizing plate 310, and gets reflected on the reflection type polarizing plate 310. The image light 50 reflected on the reflection type polarizing plate 310 enters the λ/4 plate 300 again. The image light 50 reflected on the reflection type polarizing plate 310 is linearly polarized light in the vertical direction, and thus, it is modulated, on the λ/4 plate 300, into right-handed circularly polarized light.

The image light 50 transmitted through the λ/4 plate 300 enters the reflection type doublet 120 again. On the curved surface 122 of the reflection type doublet 120, half part of the strength of the image light 50 is reflected in the downstream side. In this case, the image light 50, since reflected on the curved surface 122, receives the lens effect. In this point of view, the reflection type doublet 120 is an example of an optical element having lens power with respect to at least the image light 50. In the example in FIG. 1, the reflection type doublet 120 makes the reflected light of the image light 50 into collimated light. Note that, by reflection, the direction of the circularly polarized light is made left-handed. The remaining half is transmitted through the reflection type doublet 120, and thus is not guided to the eyes 30.

The image light 50 reflected on the reflection type doublet 120 enters the λ/4 plate 300 again. The image light 50 is left-handed circularly polarized light, and thus, when transmitted through the λ/4 plate 300, modulated into linearly polarized light in the horizontal direction. The image light 50 enters the reflection type polarizing plate 310 again, but now the image light 50 is linearly polarized light in the horizontal direction, is transmitted through the reflection type polarizing plate 310. Furthermore, it is transmitted through the polarizing plate 320 to be guided to the eyes 30.

Figure 5:
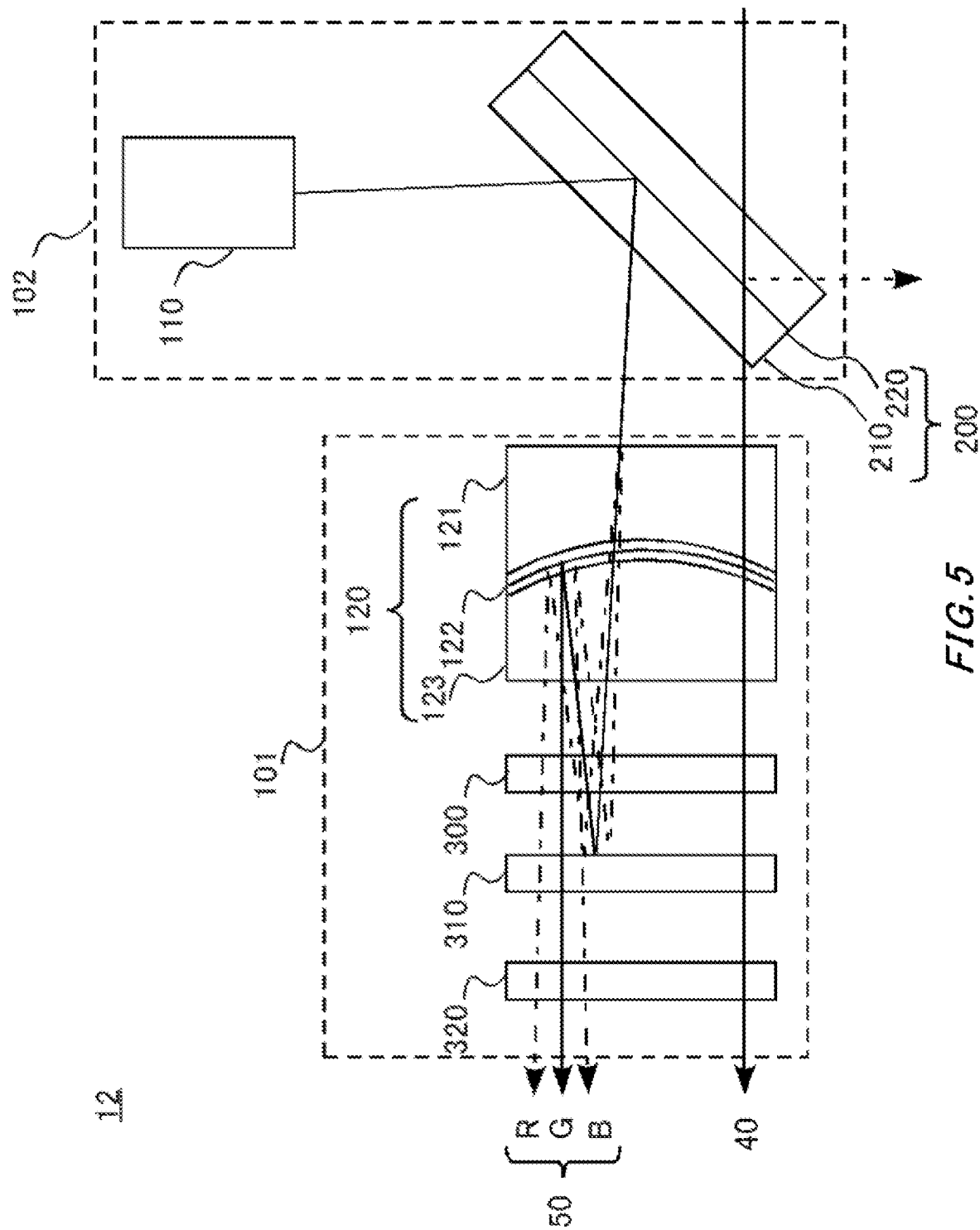
FIG. 5 is a schematic diagram illustrating an optical apparatus 12 as a comparative example.

FIG. 5 is a schematic diagram illustrating an optical apparatus 12 as a comparative example that is compared to the optical apparatus 10 in FIG. 1 to describe the GPH element 130 in FIG. 1. The optical apparatus 12 has the same optical configuration as that of the optical apparatus 10, except that the GPH element 130 is not provided the image overlay unit 102. In the optical apparatus 12, the same configurations as that of the optical apparatus 10 are given the same reference numeral, and the description is omitted.

The image light 50 is generated in an image generation unit such as the projector 110, or the like. Here, for the image generation unit such as the projector 110, optical members such as lenses are provided, and thus, the image light 50 is refracted in the course of transmission through or reflection on these optical members, and, along the refraction, wavelength dispersion of the refraction angle occurs. In the example in FIG. 5, in the course of the image light 50 being transmitted through the reflection type doublet 120 and the following reflection and emission, the emission positions and the emission angles from the reflection type doublet 120 are different for the respective colors: red (R), green (G), and blue (B), depending on the wavelength dispersion. Accordingly, there is a problem that a chromatic aberration gets large at an enlarged virtual image position and it emerges as color bleeding in the image light 50 to be visually recognized by the user.

Also when the external light 40 is transmitted through the reflection type doublet 120, the wavelength dispersion occurs, and the emission positions are different depending on the colors. However, the emission angles are the same and it is a real image that is not enlarged, and thus the chromatic aberration of the external light 40 is hardly sensed by the user.

For the chromatic aberration of the image light 50, for example, applying a so-called achromatic lens to reduce the wavelength dispersibility of the image light 50 by changing the refractive indexes of the doublet piece 121 and the doublet piece 123 of the reflection type doublet 120 can be considered. However, in that case, the reflection type doublet 120 has lens power also with respect to the transmitted light. Accordingly, when transmitted through the reflection type doublet 120, the external light 40 receives optical effects such as being enlarged, reduced, or distorted, etc., which leads to an unnatural viewing such that an image in the real world is blurred, or difference in the apparent size from that when the optical apparatus 12 is not used.

For this, in the optical apparatus 10, the GPH element 130 is used. Thereby, the wavelength dispersibility of the image light 50 generated in at least the reflection type doublet 120 is compensated.

Figure 6:
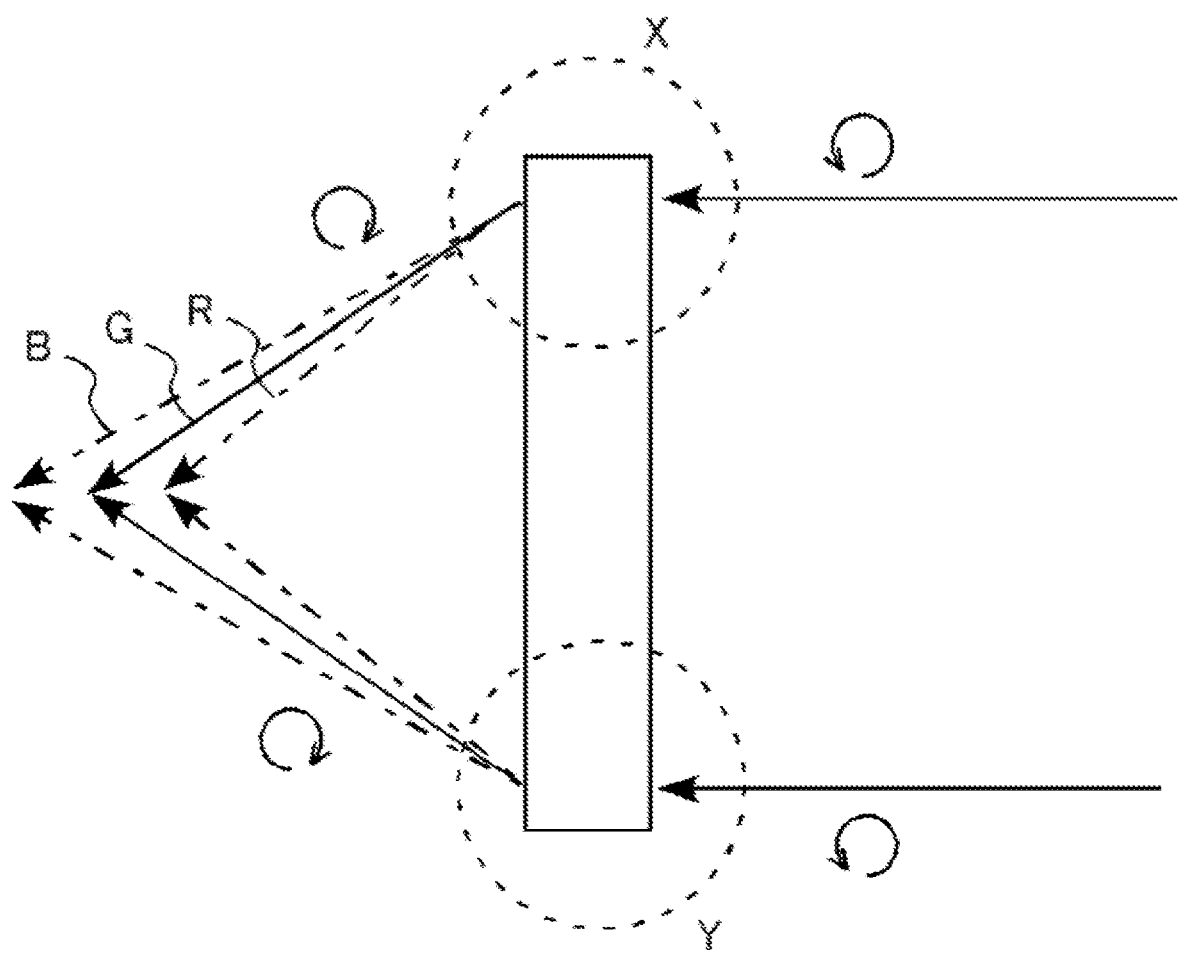
FIG. 6 is a diagram illustrating wavelength dispersibility of a GPH element 130.

FIG. 6 is a diagram illustrating wavelength dispersibility of a GPH element 130. GPH of the GPH element 130 is an abbreviation of Geometric Phase Hologram, and the GPH element 130 is a polymerizable liquid crystal that is oriented in a certain pattern. Thereby, as shown in FIG. 6, when the circularly polarized light enters, a first order diffraction of circularly polarized light obtained by inverting the polarization state of the entered circularly polarized light is output in a certain direction.

In this case, if the orientation pattern is formed such that the first order diffractions of each of the regions (e.g. regions X and Y, in the figure) are collected, the GPH element 130 can have a function of a convex lens. More specifically, by providing an orientation pattern having a concentric shape with pitches thereof getting smaller towards the outer side, the GPH element 130 functions as a convex lens. Furthermore, according to the orientation pattern, in addition to convex lenses, desired lens power such as that of concave lenses can be obtained.

Here, in the GPH element 130, the diffraction phenomenon is used, and thus wavelength dispersion that is opposite to that in the refraction occurs. In the example shown in FIG. 6, as compared with a focal point for green (G), red (R) is collected on a closer side and blue (B) is collected on a farther side of the GPH element 130.

Accordingly, in the optical apparatus 10, the GPH element 130 is provided at a position where the image light 50 enters but the external light 40 does no enter. Thereby, the wavelength dispersibility of the reflection type doublet 120 generated with respect to the image light 50 is compensated by the GPH element 130 of its inverse dispersibility generating the inverse wavelength dispersion in advance. Furthermore, by providing a lens power to the GPH element 130, the GPH element 130 can be used as the lens of the optical apparatus 10.

Note that an example where the GPH element 130 has inverse dispersibility so as to compensate the wavelength dispersibility of the reflection type doublet 120 has been described. Alternatively, in the optical apparatus 10, the GPH element 130 may compensate the wavelength dispersibility of the optical system as a whole including the reflection type doublet 120, or wavelength dispersibility of an optical element that is different from the reflection type doublet 120. In this case, the GPH element 130 may compensate the wavelength dispersibility of at least part of an optical system that is provided in the upstream side of the reflecting element 200 with respect to the image light 50, for example, a lens to optically adjust the output light from the projector 110 immediately after the projector 110.

Note that the GPH element 130 has optical properties as below. When the left-handed circularly polarized light enters the GPH element 130 whose first order diffraction angle of the emitted left-handed circularly polarized light is θ when the right-handed circularly polarized light enters, the first order diffraction angle of the emitted right-handed circularly polarized light is −θ.

Figure 7:
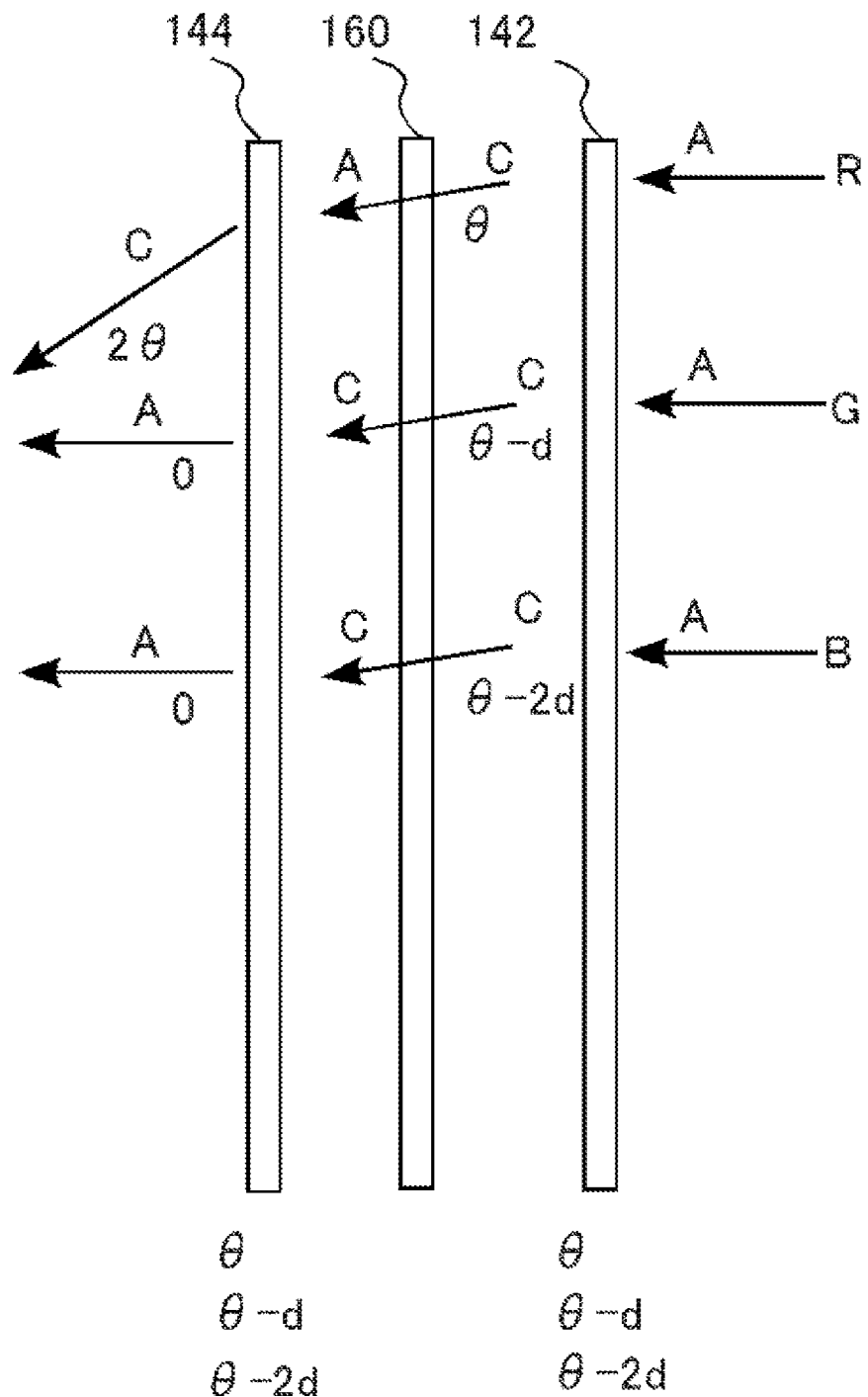
FIG. 7 is a diagram illustrating a GPH unit 140.

FIG. 7 is a diagram illustrating a GPH unit 140. For the GPH element 130 described above, when material and lens power etc. are determined, characteristics of the wavelength dispersion are almost determined. Thus, desired inverse dispersibility cannot be achieved with the single GPH element 130, in some cases. Thus, in the GPH unit 140, by combining a plurality of GPH elements and a polarization conversion element, the desired inverse dispersibility is achieved.

In the GPH unit 140, the polarization conversion element 160 is provided between the GPH elements 142, 144. In the polarization conversion element 160, the polarization state within a particular band of the entering light is modulated, but the polarization state outside the particular band is kept unchanged. In the example in FIG. 7, the polarization conversion element 160 inverts the direction of polarization of the band for red (R). On the other hand, the polarization conversion element 160 keeps the directions of polarization of the bands for green (G) and blue (B) unchanged, that is, does not invert the directions of polarization.

0, θ, d etc. shown next to ray arrows in FIG. 7 indicate angles for the rays to proceed. C shown closer to each ray arrow indicates that the ray is right-handed (clockwise) circularly polarized light, whereas A indicates that the ray is left-handed (counterclockwise) circularly polarized light.

θ and the like shown below each GPH element are diffraction angles with respect to the left-handed circularly polarized light of the corresponding GPH element, and the diffraction angles are shown considering the wavelength dispersion. For the GPH element 142, the diffraction angle of red (R) is θ, the diffraction angle of green (G) is θ−d, and the diffraction angle of blue (B) is θ−2d. Also, the GPH element 144 has the same optical properties as those of the GPH element 142.

When the GPH elements 142, 144 and the polarization conversion element 160 are combined as shown in FIG. 7, a ray of red (R) entering the GPH unit 140 at the angle of 0° (the normal direction) is diffracted on both the GPH element 142 and the GPH element 144 by θ and thus is diffracted into the direction of 2θ, as a result. On the other hand, a ray of green (G) entering at 0° is diffracted in the direction of θ−d on the GPH element 142, but, when it enters the GPH element 144, the rotation direction of the circularly polarized light is opposite to that at the time of entering the GPH element 142, and thus it is diffracted into the direction of −(θ−d) on the GPH element 144 and, as a result, output in the direction of 0°. Similarly, a ray of blue (B) enter at 0° is output in the direction of 0°. In this manner, the GPH unit 140 can direct the direction of any one of the rays of the three colors entering from the same direction into a different direction.

Figure 8:
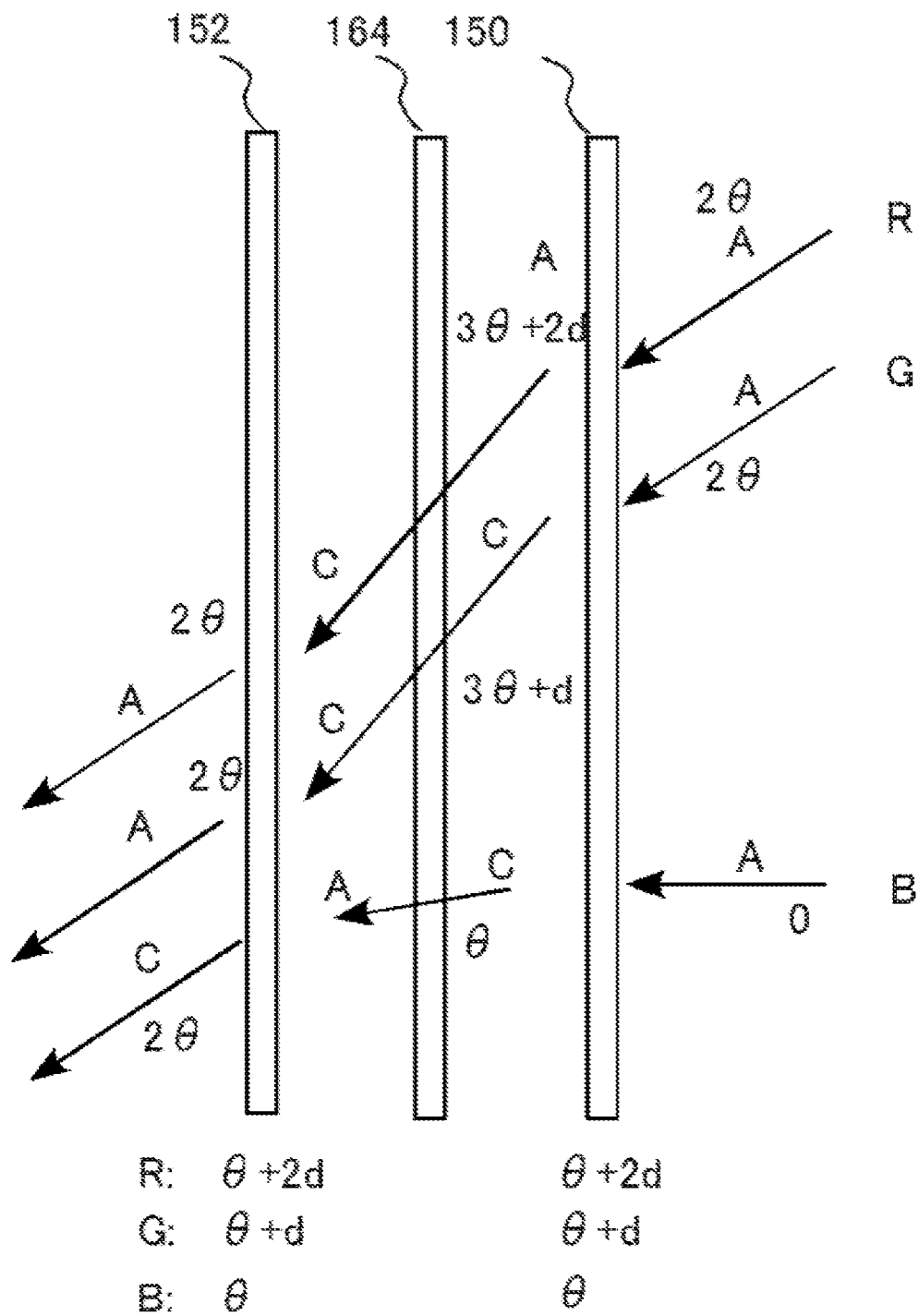
FIG. 8 is a diagram illustrating a GPH unit 154.

FIG. 8 is another diagram illustrating a GPH unit 154. The symbols used in FIG. 8 denote the same as what those used in FIG. 7 denote.

In the GPH unit 154, the polarization conversion element 164 is provided between the GPH elements 150, 152. In the example in FIG. 8, the polarization conversion element 164 inverts the direction of polarization of the band for blue (B). On the other hand, the polarization conversion element 164 keeps the directions of polarization of the bands for red (R) and green (G) unchanged, that is, does not invert the directions of polarization.

When the GPH elements 150, 152 and the polarization conversion element 164 are combined in FIG. 8, the ray of red (R) entering the GPH unit 140 at the angle of 2θ is diffracted on the GPH element 150 by θ+2d, but, when entering the GPH element 152, the rotation direction of the circularly polarized light is opposite to that for entering the GPH element 150, and thus the ray of red (R) is diffracted on the GPH element 152 by −(θ+2d) and, as a result, is output in the direction of 2θ. Similarly, the ray of green (G) enter at 2θ is output in the direction of 2θ. On the other hand, the ray of blue (B) entering at 0° is diffracted in the direction of θ on the GPH element 150 and further diffracted in the direction of θ on the GPH element 152, and, as a result, output in the direction of 2θ. In this manner, the GPH unit 154 can direct the directions of the rays of the three colors entering from different directions into a same direction.

As described above, by combination of the GPH element and the polarization conversion elements in the GPH unit, as compared with the single GPH element, the GPH unit, as a whole, can make the inverse dispersibility smaller by making the diffraction angle of red (R) smaller and making the diffraction angle of blue (B) bigger. On the other hand, as compared with the single GPH element, the GPH unit, as a whole, can make the inverse dispersibility bigger by making the diffraction angle of red (R) bigger and making the diffraction angle of blue (B) smaller.

Figure 9:
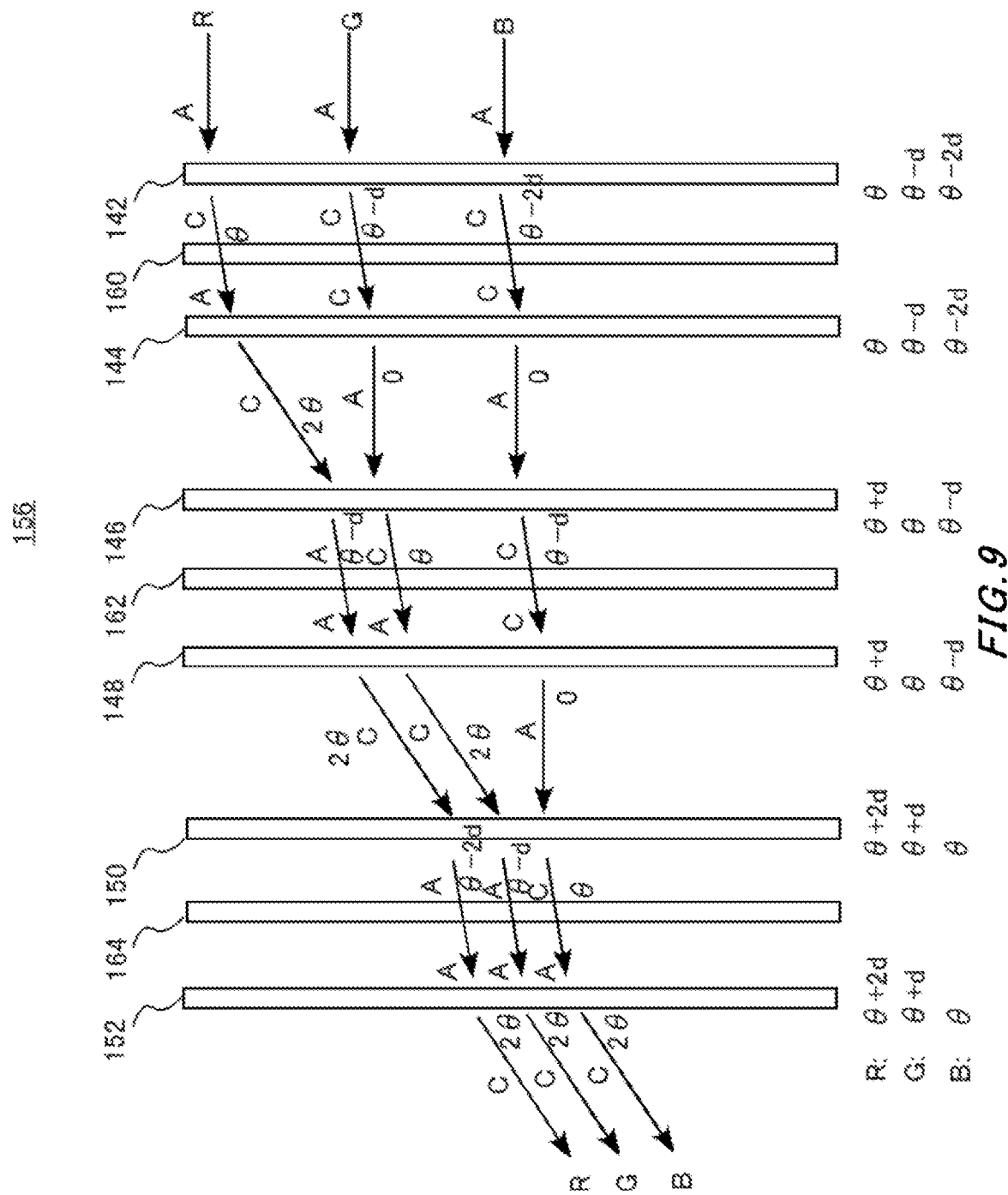
FIG. 9 is a diagram illustrating a GPH unit 156.

FIG. 9 is a diagram illustrating still another GPH unit 156. In FIG. 9, those given the same reference numerals in FIGS. 7 and 8 have the same optical characteristic. Also, the symbols used in FIG. 9 denote the same as what those used in FIG. 7 denote.

The GPH unit 156 has six GPH elements 142, 144, 146, 148, 150, and 152, and three polarization conversion elements 160, 162, and 164. Between the GPH elements 142, 144, the polarization conversion element 160 is provided. Similarly, between the GPH elements 146, 148, the polarization conversion element 162 is provided, and between the GPH elements 150, 152, the polarization conversion element 164 is provided.

The polarization conversion element 162 inverts the direction of polarization of the band for green (G), whereas it keeps the direction of polarization of the bands for red (R) and blue (B) unchanged. The polarization conversion elements 160, 164 have the same optical properties as those illustrated in FIGS. 7 and 8. Also, the GPH element that is provided on the input side of the polarization conversion element has the same optical characteristic as that of the GPH element that is provided on the output side.

By combining the GPH elements 142, 144, 146, 148, 150, and 152 and the polarization conversion element 160, 162, and 164 as shown in FIG. 9, the rays of red (R), green (G), and blue (B) entering the GPH unit 140 at the angle of 0° (normal direction) are all emitted at 2θ. Thus, the GPH unit 156 in FIG. 9 does not have inverse dispersibility. Furthermore, by changing the angle of diffraction on each GPH element from θ, a GPH unit 156 having desired inverse dispersibility can be configured. Furthermore, the desired inverse dispersibility may be achieved by picking up narrow wavelength bands for red (R), green (G) and blue (B) respectively using band pass filters and combining them with the GPH unit 156.

Figure 10:
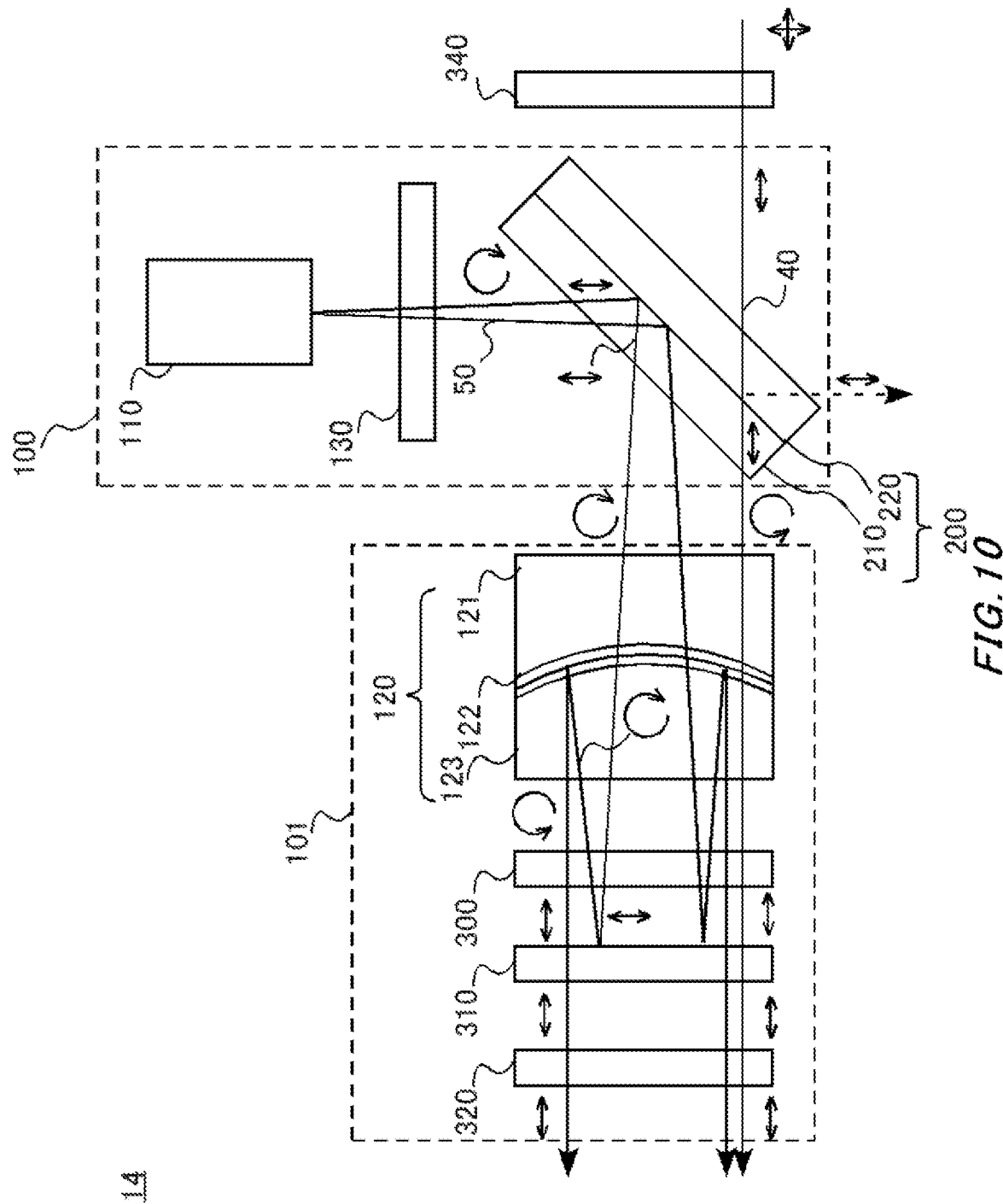
FIG. 10 shows another optical apparatus 14.

FIG. 10 shows another optical apparatus 14. The optical apparatus 14 has the same configuration as that of the optical apparatus 10, except for having the external light adjusting unit 340 provided. In the optical apparatus 14, the same configuration as that of the optical apparatus 10 is given the same reference numeral, and the description is omitted.

The external light adjusting unit 340 is, with respect to the external light 40, provided in the upstream side of the reflecting element 200. The external light adjusting unit 340 can adjust the strength of the external light 40 to be transmitted by adjusting the transmittance. One example of the external light adjusting unit 340 is a liquid crystal shutter.

Here, when the external light adjusting unit 340 adjusts transmittance utilizing polarization such as a liquid crystal shutter, it is preferable that the direction of polarization of the external light 40 output from the external light adjusting unit 340 is made into a direction of polarization so as to be transmitted through the reflecting element 200. Thereby, the external light 40 output from the external light adjusting unit 340 can be used efficiently.

Note that, as an alternative to the liquid crystal shutter, the external light adjusting unit 340 may use a polarizing plate. In this case, according to the direction of the optical axis of the polarizing plate, the amplitude of a component of linearly polarized light to be transmitted through the reflecting element 200 within the transmitted external light 40 is determined. Thus, by the polarizing plate and the reflecting element 200 working together, the strength of the external light 40 can be adjusted.

Figure 11:
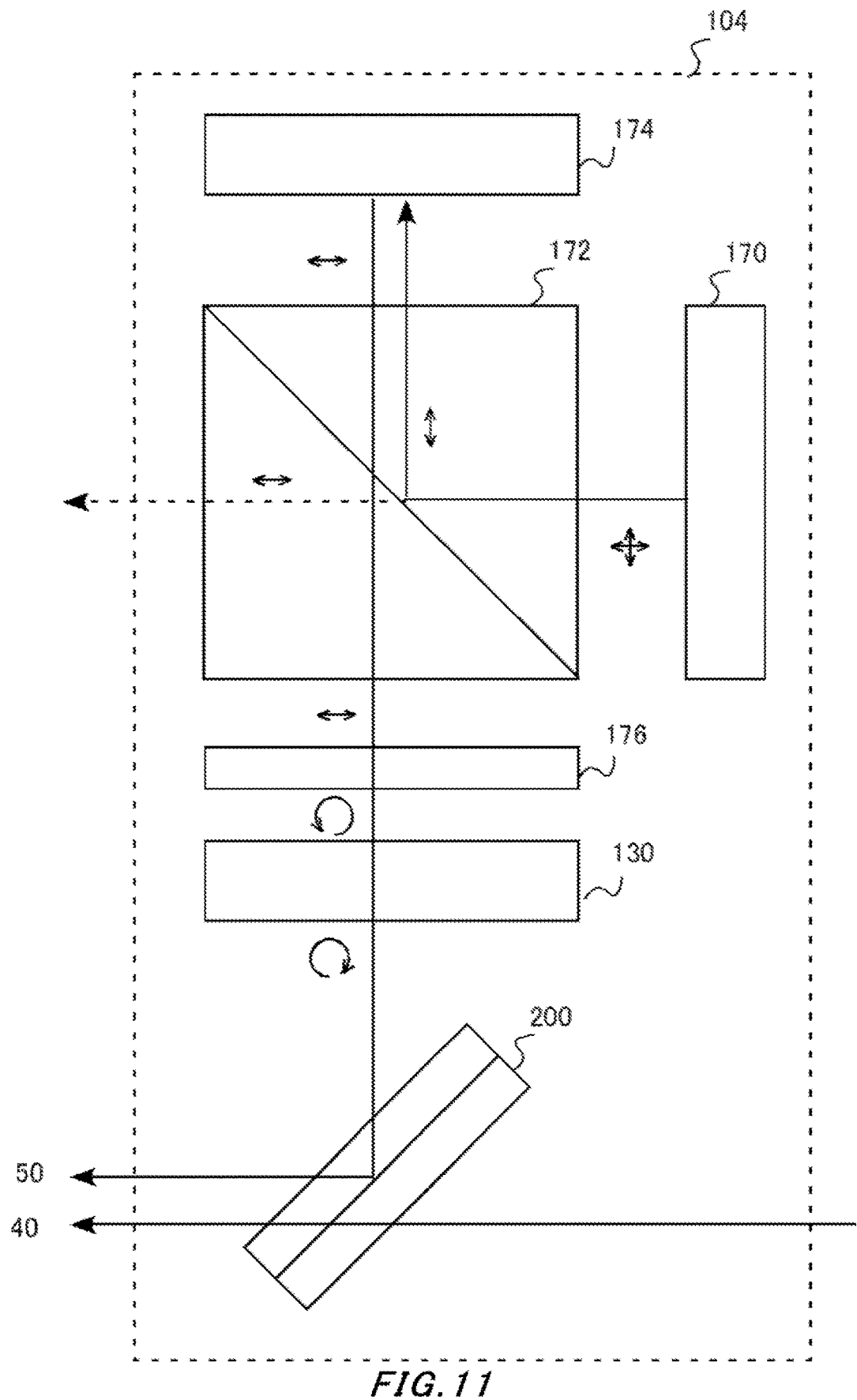
FIG. 11 shows another image overlay unit 104.

FIG. 11 shows another image overlay unit 104. In the image overlay unit 104, the same configuration as that of the image overlay unit 100 is given the same reference numeral, and the description is omitted. The image overlay unit 104 has a back light 170, a polarizing beam splitter 172, a liquid crystal panel 174, a λ/4 plate 176, a GPH element 130, and a reflecting element 200.

The back light 170 emits unpolarized lights in red, green, and blue in a time-division manner. The polarizing beam splitter 172 reflects S polarization in the light entering from the back light and directs it into the liquid crystal panel 174.

The liquid crystal panel 174 has a plurality of pixels that are provided two-dimensionally. Each pixel can switch the states, utilizing the polarization, between the state for reflection of entering light and the state for absorption of entering light. By the outputs from these pixels, the image light 50 in color can be achieved. When a digital gray scale method is used for the liquid crystal panel 174, the entering light is expressed as gray scales by the duty ratio of the time when the direction of polarization is rotated by 90° and the time when it is not rotated, and the image light 50 is output as the linearly polarized light in the horizontal direction. On the other hand, when an analog gray scale method is used for the liquid crystal panel 174, the image light 50 obtained by rotating the direction of polarization of the entering light at an angle corresponding to the gray scale is output.

A component of the linearly polarized light in the horizontal direction in the image light 50 is transmitted through the polarizing beam splitter 172 and enters the λ/4 plate 176. By the λ/4 plate 176, the image light 50 is modulated from the linearly polarized light in the horizontal direction into left-handed circularly polarized light and enters the GPH element 130.

Figure 12:
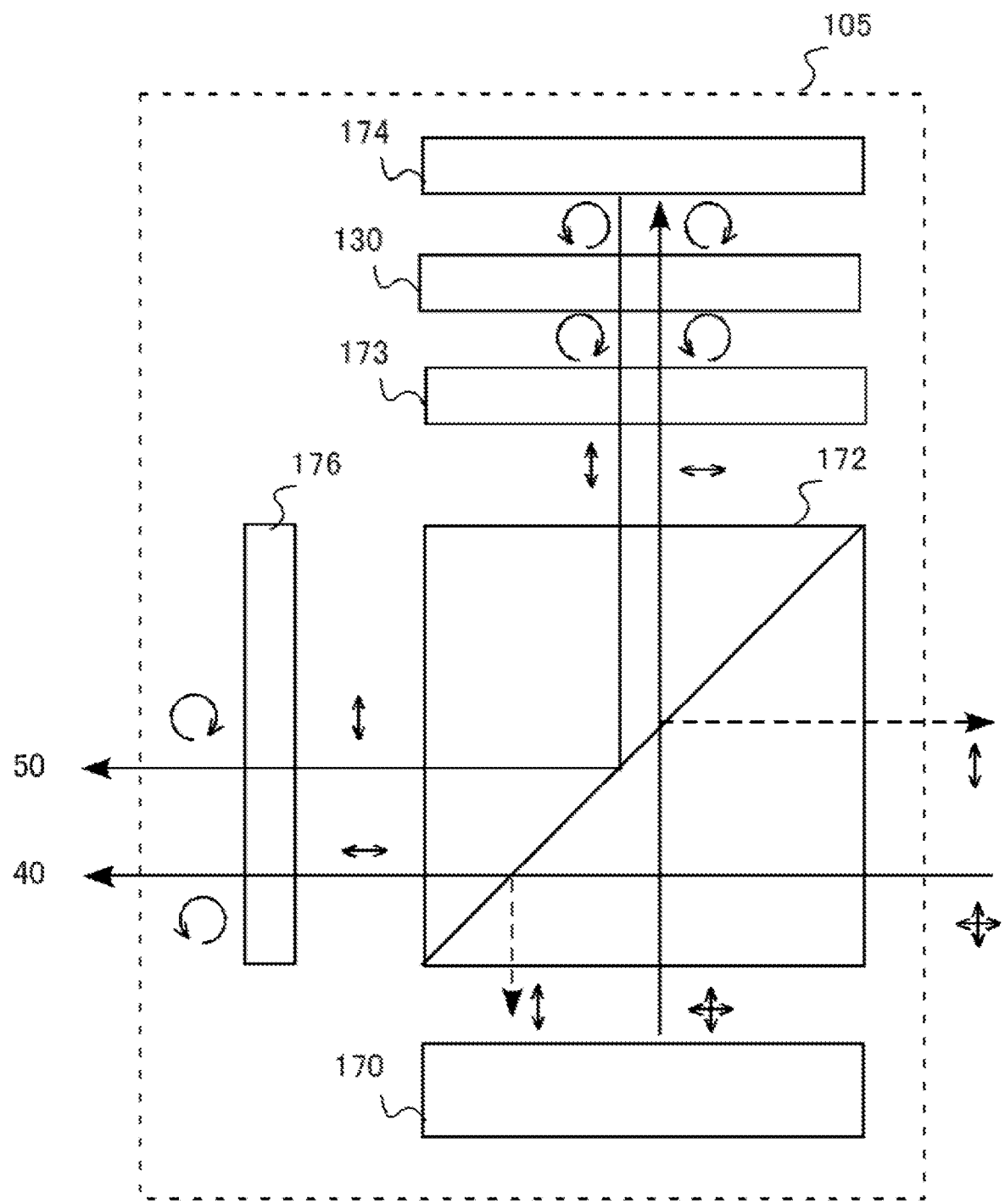
FIG. 12 shows still another image overlay unit 105.

FIG. 12 shows still another image overlay unit 105. In the image overlay unit 105, the same configuration as that of the image overlay units 100, 104 is given the same reference numeral, and the description is omitted. The image overlay unit 105 has a back light 170, a polarizing beam splitter 172, a liquid crystal panel 174, and λ/4 plates 173, 176.

This the back light 170, as different from the back light 170 of the image overlay unit 104, is provided on the opposite side of the polarizing beam splitter 172. The polarizing beam splitter 172 transmits a component of the linearly polarized light in the horizontal direction in the light entering from the back light and makes it enter the liquid crystal panel 174.

Like the case in FIG. 11, the liquid crystal panel 174 outputs, when reflecting the entering light, the image light 50 obtained by rotating the direction of polarization. A component of the linearly polarized light in the vertical direction in the image light 50 reflects on the polarizing beam splitter 172 and enters the λ/4 plate 176. The image light 50 of the linearly polarized light in the vertical direction is modulated into right-handed circularly polarized light through the λ/4 plate 176 and enters the reflection type doublet 120.

On the other hand, a component of linearly polarized light in the horizontal direction in the external light 40 is transmitted through the polarizing beam splitter 172 and enters the λ/4 plate. The external light 40 being the linearly polarized light in the horizontal direction is modulated into left-handed circularly polarized light through the λ/4 plate 176 and enters the reflection type doublet 120. Thereby, on the external light 40, the image light 50 is overlaid. The GPH element 130 is provided between the λ/4 plate 173 and the liquid crystal panel 174.

Figure 13:
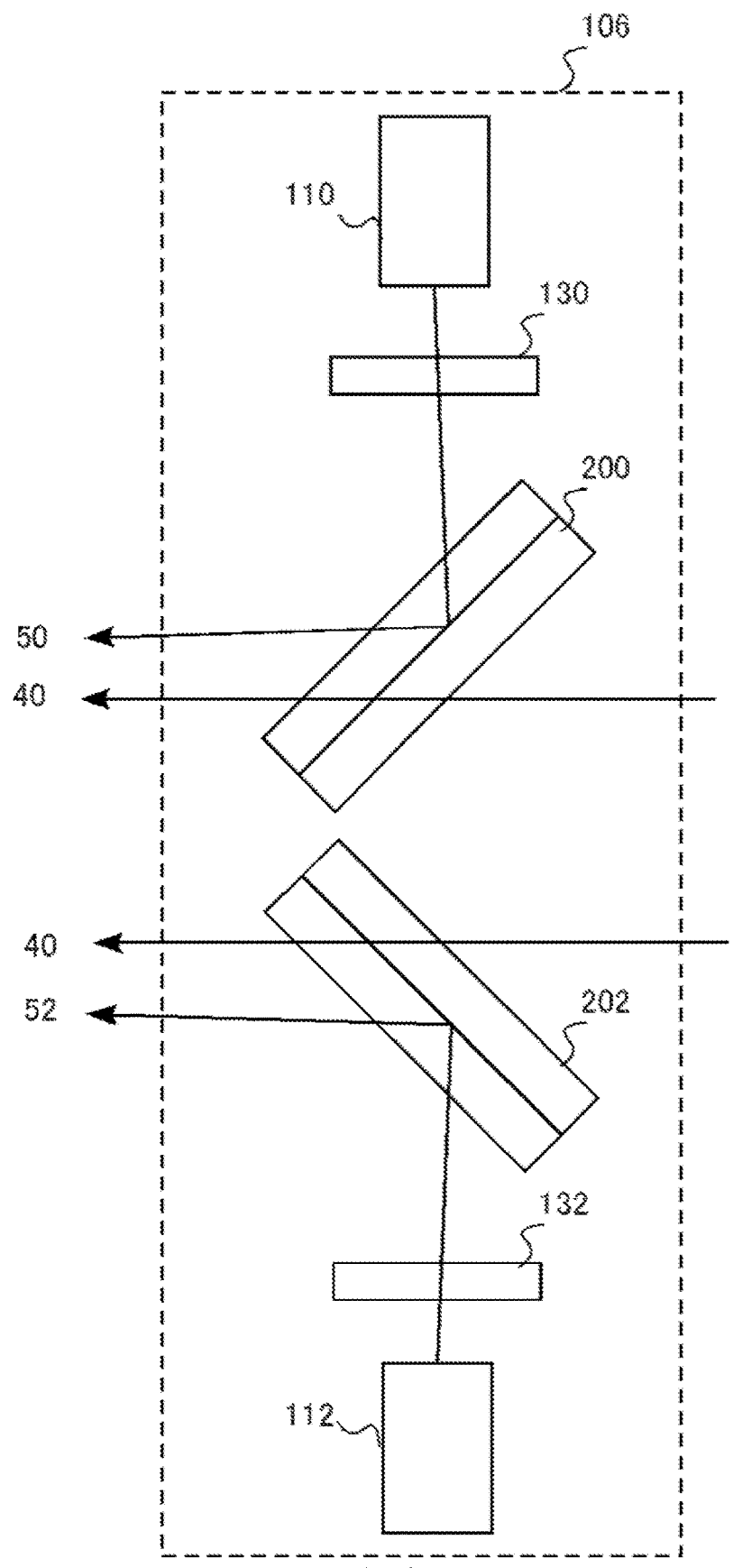
FIG. 13 shows still another image overlay unit 106.

FIG. 13 shows still another image overlay unit 106. In the image overlay unit 106, the same configuration as that of the image overlay unit 100 is given the same reference numeral, and the description is omitted. The image overlay unit 106 has two sets: one set configured of a projector 110, a GPH element 130, and a reflecting element 200; and, being provided symmetrically to this set, the other set configured of a projector 112, a GPH element 132 and a reflecting element 202.

The set of the projector 112, the GPH element 132 and the reflecting element 202 generates the image light 52 and overlay it on the external light 40. The projector 112, the GPH element 132, and the reflecting element 202 each have the same functions as the projector 110, the GPH element 130, and the reflecting element 200 respectively, and thus the description is omitted.

Figure 14:
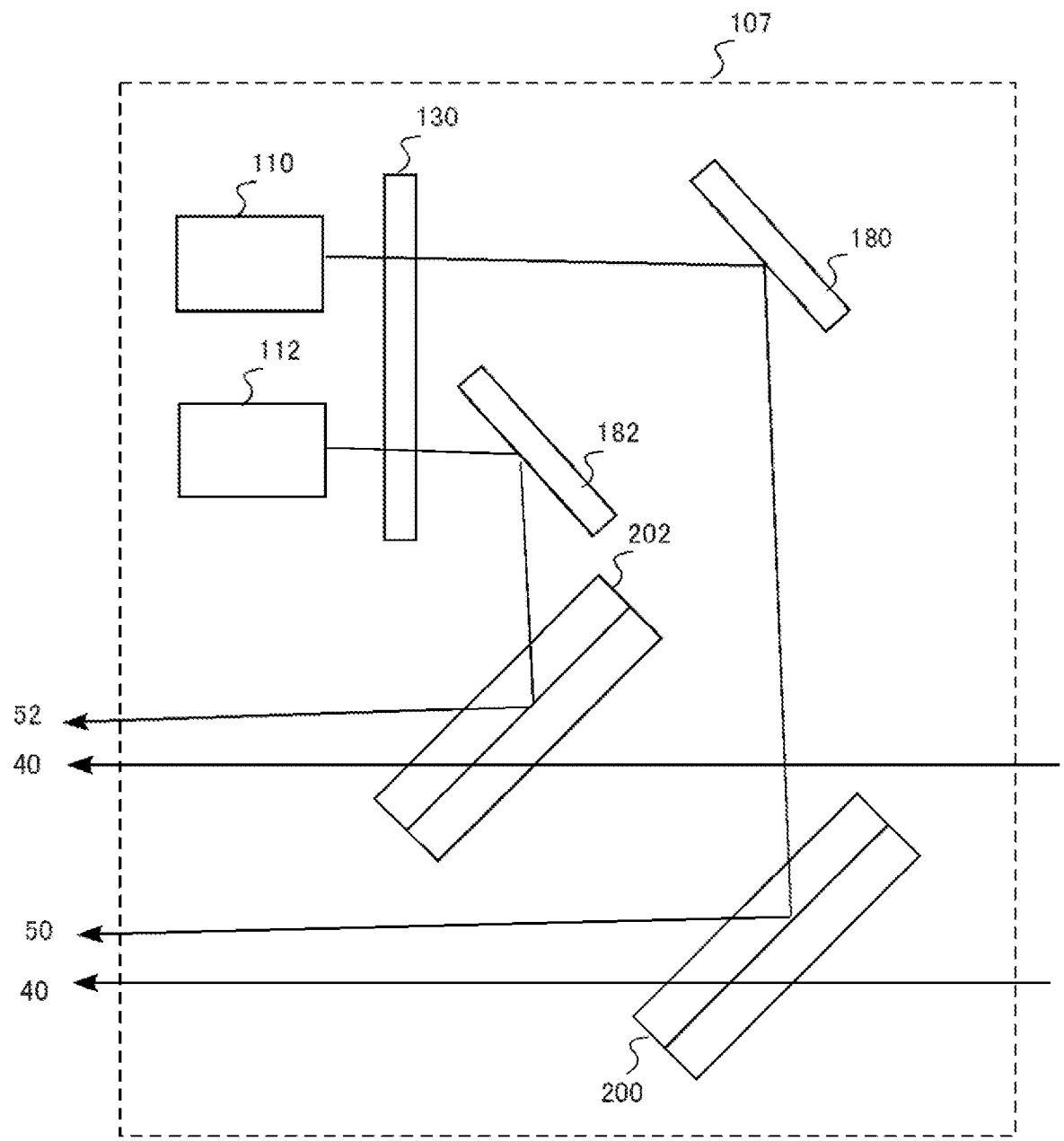
FIG. 14 shows still another image overlay unit 107.

FIG. 14 shows still another image overlay unit 107. In the image overlay unit 107, the same configuration as that of the image overlay unit 100 is given the same reference numeral, and the description is omitted. The image overlay unit 107 has a set: a projector 110, a mirror 180, and a reflecting element 200; and another set: a projector 112, a mirror 182, and a reflecting element 202. The GPH element 130 is used in common between the two sets described above.

The image light 50 from the projector 110 is reflected on the mirror 180 and the reflecting element 200, and overlaid on the external light 40. Similarly, the projector 112 is generated in the image light 52 and reflected on the mirror 182 and the reflecting element 202, and overlaid on the external light 40.

Note that the optical path of the image light 50 is preferably arranged not to interfere the light of the image light 52. When the optical paths are interfered, alternatively to the mirror 182, a half mirror to transmit and reflect at a desired ratio regardless of the polarization state may be provided. Furthermore, the number of sets of projectors, mirrors, and reflecting elements are not limited to two, and may be three or more.

Figure 15:
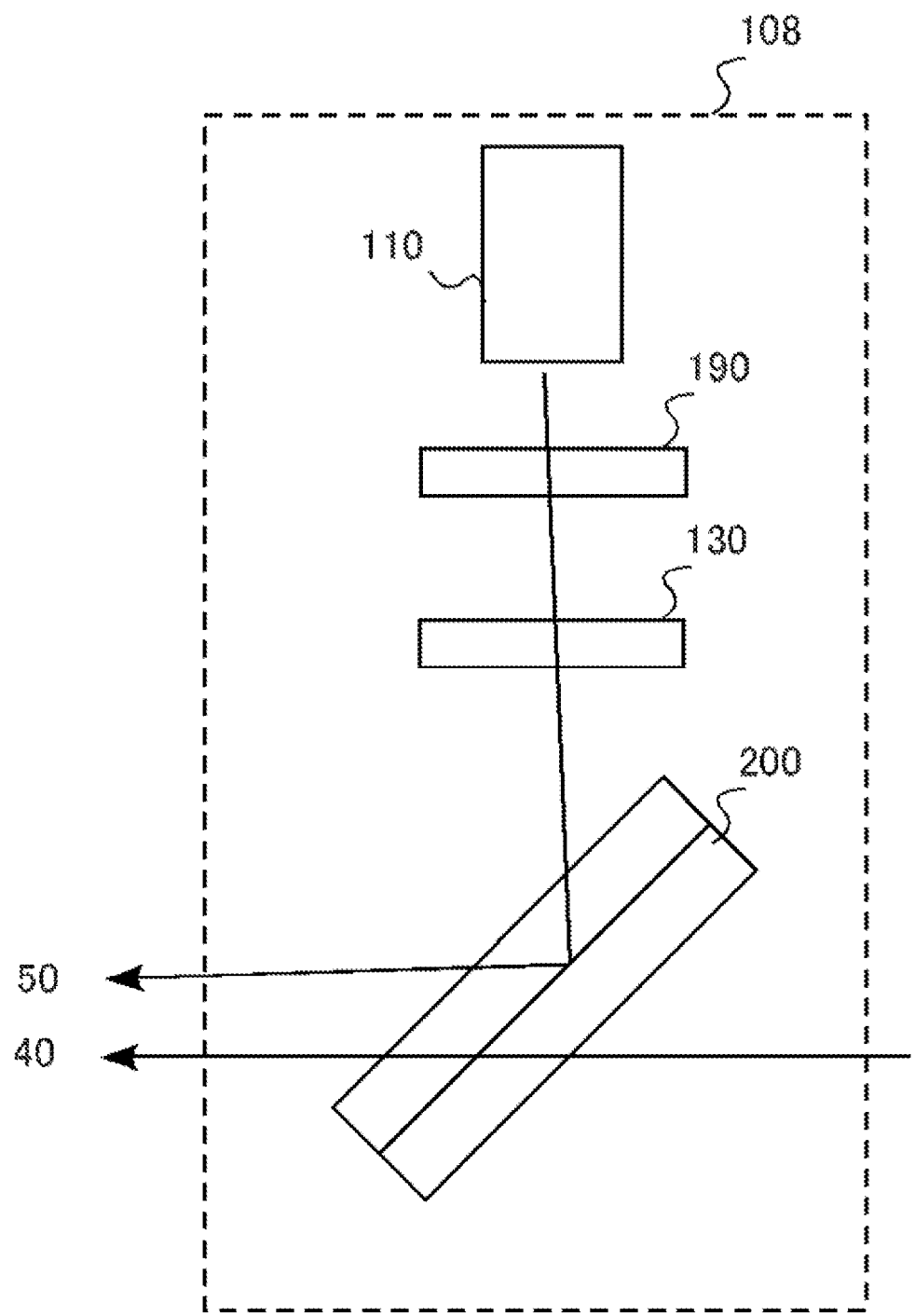
FIG. 15 shows still another image overlay unit 108.

FIG. 15 shows still another image overlay unit 108. In the image overlay unit 108, the same configuration as that of the image overlay unit 100 is given the same reference numeral, and the description is omitted. Between the projector 110 and the GPH element 130, the image overlay unit 108 has an erecting optical system 190.

The erecting optical system 190 has, for example, an erecting imaging lens and a magnifying optical system. The erecting imaging lens is a SELFOC (registered trademark) lens, an erecting imaging lens configured of a plurality of lens arrays, or the like. The magnifying optical system is a fresnel lens, or the like. Note that the erecting optical system 190 may be used for any of the image overlay units 104, or the like in FIGS. 11 to 15.

Figure 16:
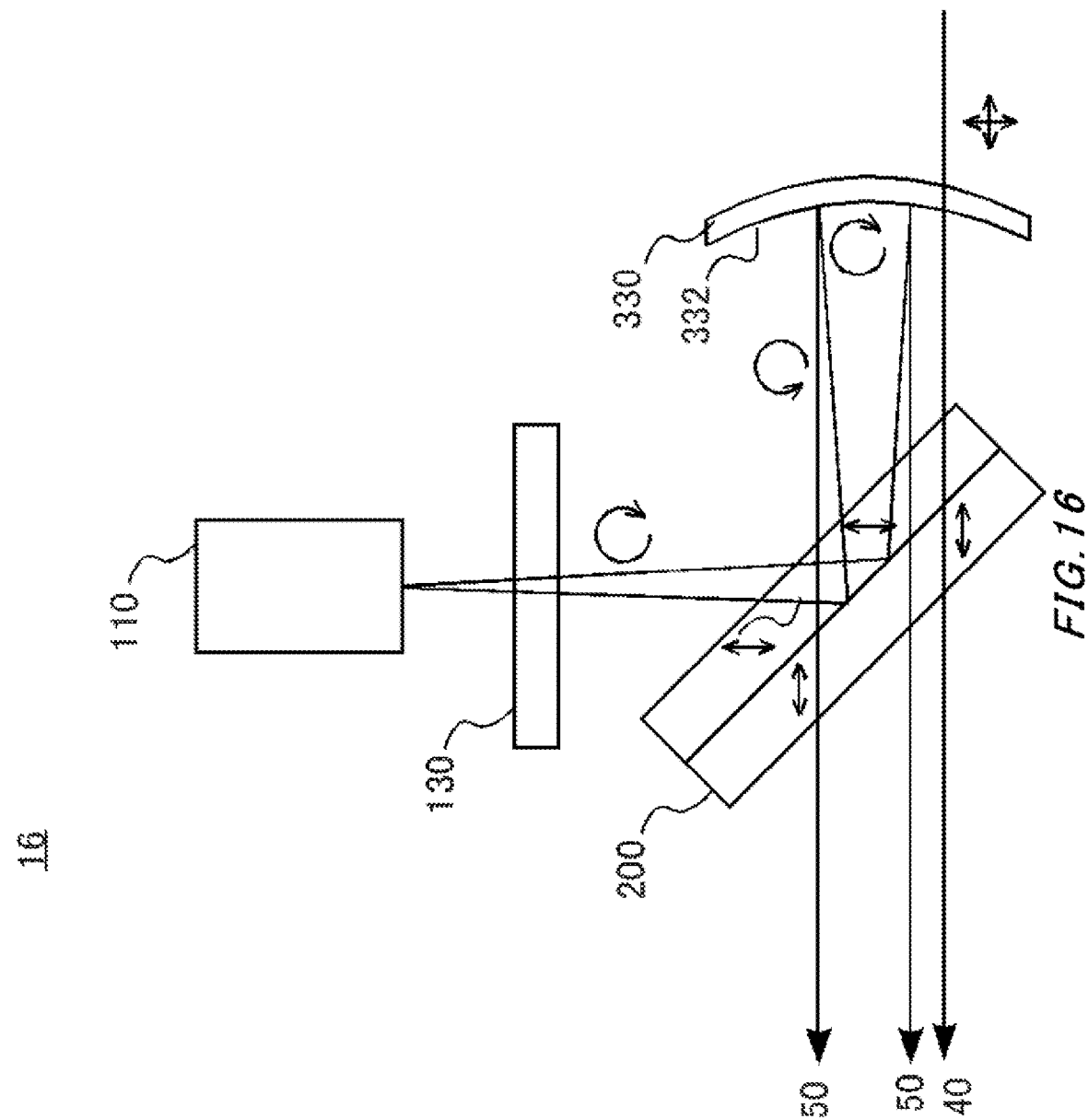
FIG. 16 shows another optical apparatus 16.

FIG. 16 shows another optical apparatus 16. In the optical apparatus 16, the same configuration as that of the optical apparatus 10 is given the same reference numeral, and the description is omitted.

In the optical apparatus 16, the direction in which the reflecting element 200 in inclined is opposite to that in the optical apparatus 10. Thereby, in the optical apparatus 16, the reflecting element 200 reflects the image light 50 in the upstream side of the external light 40.

With respect to the external light 40, in the upstream side of the reflecting element 200, a curved half mirror 330 is provided. The curved half mirror 330 has a curved surface 332, and, regardless the polarization state, transmits half part of the strength of the entering light and reflects the other half on the curved surface 332. Thereby, it reflects the half part of the strength of the image light 50, and give the lens effect on the curved surface 332. In the example in FIG. 16, the reflected image light 50 is made into collimated light.

On the other hand, half part of the strength of the external light 40 is transmitted through the curved half mirror 330, but receives no lens effect on the curved surface 332. Thereby, the image light 50 is overlaid on the external light 40 and guided to the eyes of the user.

As described above, in any of the embodiments, the reflecting element 200 reflects one of the linearly polarized lights that are orthogonal to each other, and transmits the other. Alternatively, a half mirror, regardless of the polarization state, to reflect half part of the strength of the entering light and to transmit the remaining part may be used. Furthermore, in the half mirrors in any of the embodiments described above, the ratio of the reflection and the transmission is 1:1, but alternatively, any ratio may do.

Note that, in any of the embodiments described above, the reflecting element 200 is inclined by 45° with respect to the entering direction of the external light 40 and the image light 50, but the inclination angle may be other than 45°. Also, in any of the embodiments described above, it has been described that the polarization states are linearly polarized light and circularly polarized light, but this can be also applied for when the polarization state is elliptically polarized light due to reasons such as design tolerances.

Note that, in any of the embodiments described above, the reflection type doublet 120 and the curved half mirror 330 have lens power to make the image light 50 into collimated light. However, the reflection type doublet 120 and the curved half mirror 330 may have lens power of another strength.

Furthermore, in any of the embodiments described above, between the GPH element 130 etc. and the reflecting element 200 etc., another optical element such as a convex lens may be provided.

In any of the embodiments described above, as an alternative to the reflection type doublet 120, a reflection type optical system that is configured of three or more optical elements and has a curved surface to transmit part of the entering light and reflect the other part, may be used. In that case, it is preferable that the optical elements fit each other on the fitting surface, and their refractive indexes coincide each other within a predetermined range, for example, they are equal to each other. Instead, as an alternative to the reflection type doublet 120, a reflection type doublet whose fitting surfaces of the pair of pieces are both plane and their surfaces on the other-side not fitting have the same curvatures, may be used.

Figure 17:
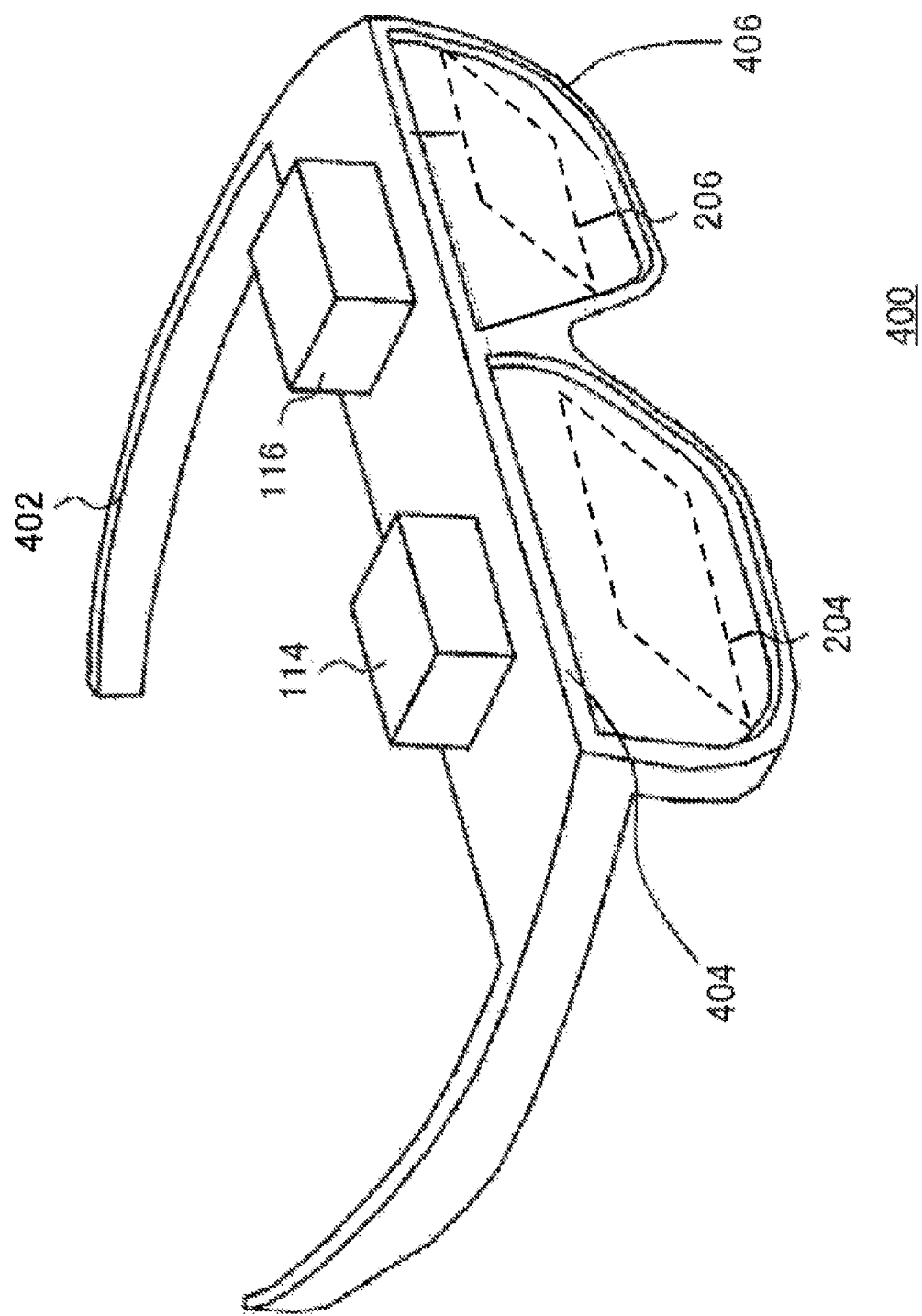
FIG. 17 shows an exemplary spectacle type display device 400.

FIG. 17 shows an exemplary spectacle type display device 400 utilizing the optical apparatus 10 in the present embodiment. The spectacle type display device 400 includes the optical apparatus 10 and a frame 402 of spectacle type, and, with the frame 402, may be worn by an observer in a similar form of a pair of glasses.

The spectacle type display device 400 includes projectors 114, 116 above areas corresponding to the eye positions of the user of a pair of glasses, the projectors 114, 116 output, in the downward direction, image light for the left eye and image light for the right eye. Also, inside a rim 404 on the right-eye side and a rim 406 on the left-eye side of the spectacle type display device 400, members except for the projector of the optical apparatus 10 including the reflecting elements 204, 206 are provided. These guide the image lights output from the projectors 114, 116 to each of the eyes of the user. The spectacle type display device 400 may further include other optical systems such as lenses.

The spectacle type display device 400 may provide the projectors 114, 116 in the other parts. For example, the spectacle type display device 400 may provide the projectors 114, 116 below, inside, or outside the areas corresponding to the eyes. Also, the optical apparatus 10 etc. and the spectacle type display device 400 may include, not shown in the figure, necessary elements such as processors to control the image overlay unit 100 etc. and batteries etc. to supply electric power to them. Note that, in the spectacle type display device 400, the configuration may be such that reflecting elements etc. to overlay the image are provided to one of the left and right eyes, while they are not provided to the other eye.

Figure 18:
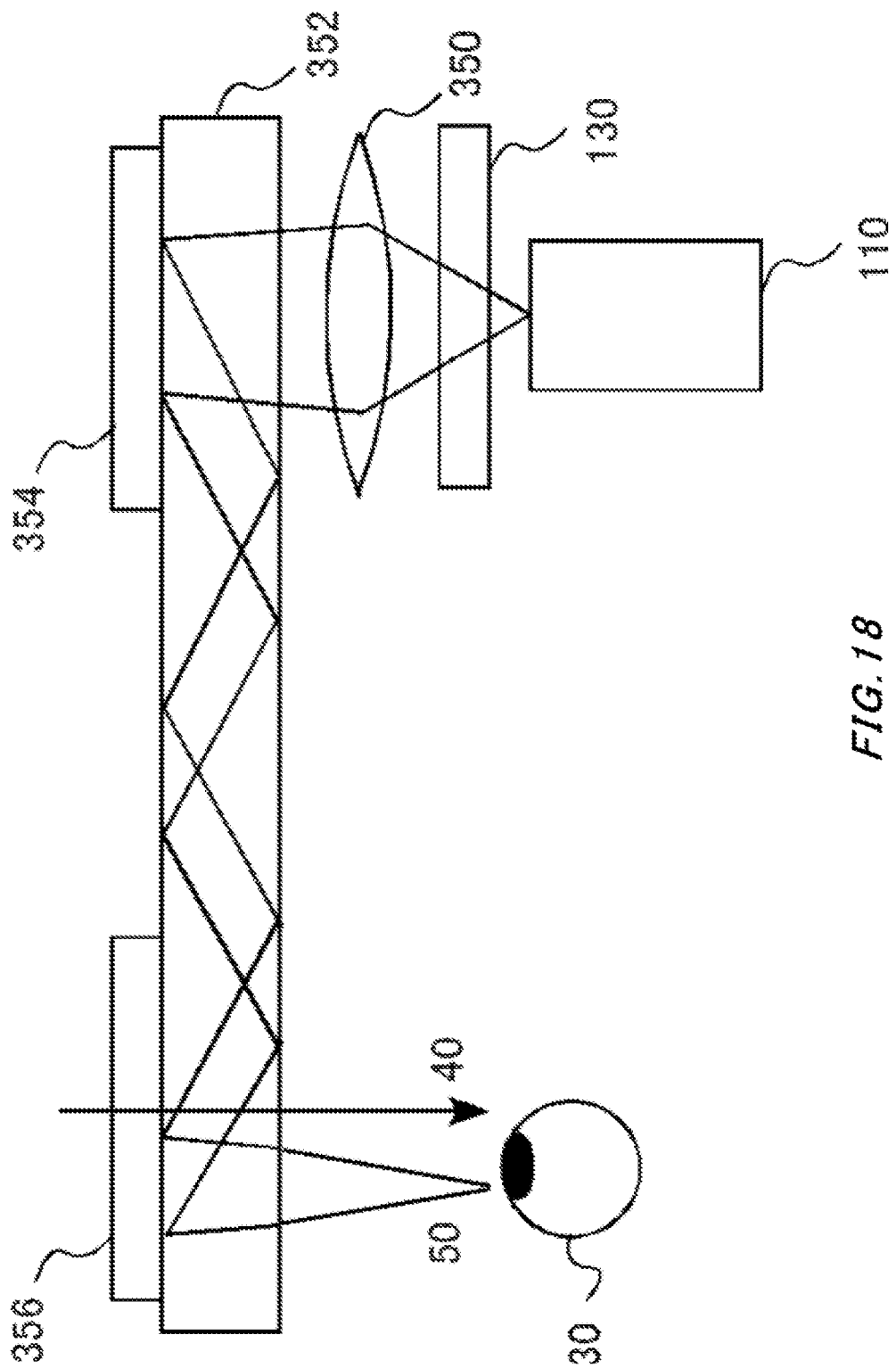
FIG. 18 shows still another optical apparatus 18.

FIG. 18 shows still another optical apparatus 18. The optical apparatus 18 overlays the image light 50 on the external light 40 in the real world utilizing the light guide plate 352, and guides the resultant light to the eyes of the user 30.

The optical apparatus 18 has a projector 110, a GPH element 130, a lens 350, a light guide plate 352, and deflection elements 354, 356. The projector 110 generates the image light 50 and emits it as diffused light. The lens 350 collects the image light 50 to the eyes 30.

The image light 50 emitted from the lens 350 enters the light guide plate 352. To the light guide plate 352, the deflection element 354 is attached. The deflection element 354 deflects the direction of the image light 50 having entered the light guide plate 352 into a direction such that total reflection occurs inside the light guide plate 352. Here, the light guide plate 352 totally reflects the entered light therein and propagates the resultant light, and thus the light guide plate 352 can be regarded as an example of the reflecting element. Examples for the deflection element 354 are mirrors, holograms, diffraction elements, half mirrors having multi-layer laminated structures, or the like.

To the light guide plate 352, a deflection element 356 is further attached. The deflection element 356 deflects the direction of the image light 50 that has been totally reflected inside the light guide plate 352 and reached the deflection element 356, into the direction to the eyes 30. Examples for the deflection element 356 are holograms, diffraction elements, half mirrors having multi-layer laminated structures, or the like.

By the configuration described above, in the optical apparatus 18, the image light 50 is overlaid on the external light 40 and guided to the eyes of the user 30. Here, in the image light 50, wavelength dispersion of the refraction angle accompanying the refraction occurs in the projector 110 and the lens 350 etc., in the present embodiment, by providing the GPH element 130, this wavelength dispersibility is compensated. Thereby, in the optical apparatus 18 utilizing the light guide plate 352, color bleeding in the image light 50 felt by the user can be reduced.

Note that the optical apparatus 18 using the light guide plate 352 may not use polarization when overlaying the image. Thus, also in FIG. 18, description of the direction of polarization is omitted. Also, the configuration of the optical apparatus 18 may be such that, to one of the left and right eyes, light guide plates etc. to overlay the image are provided, and they are not provided to the other eye.

Figure 19:
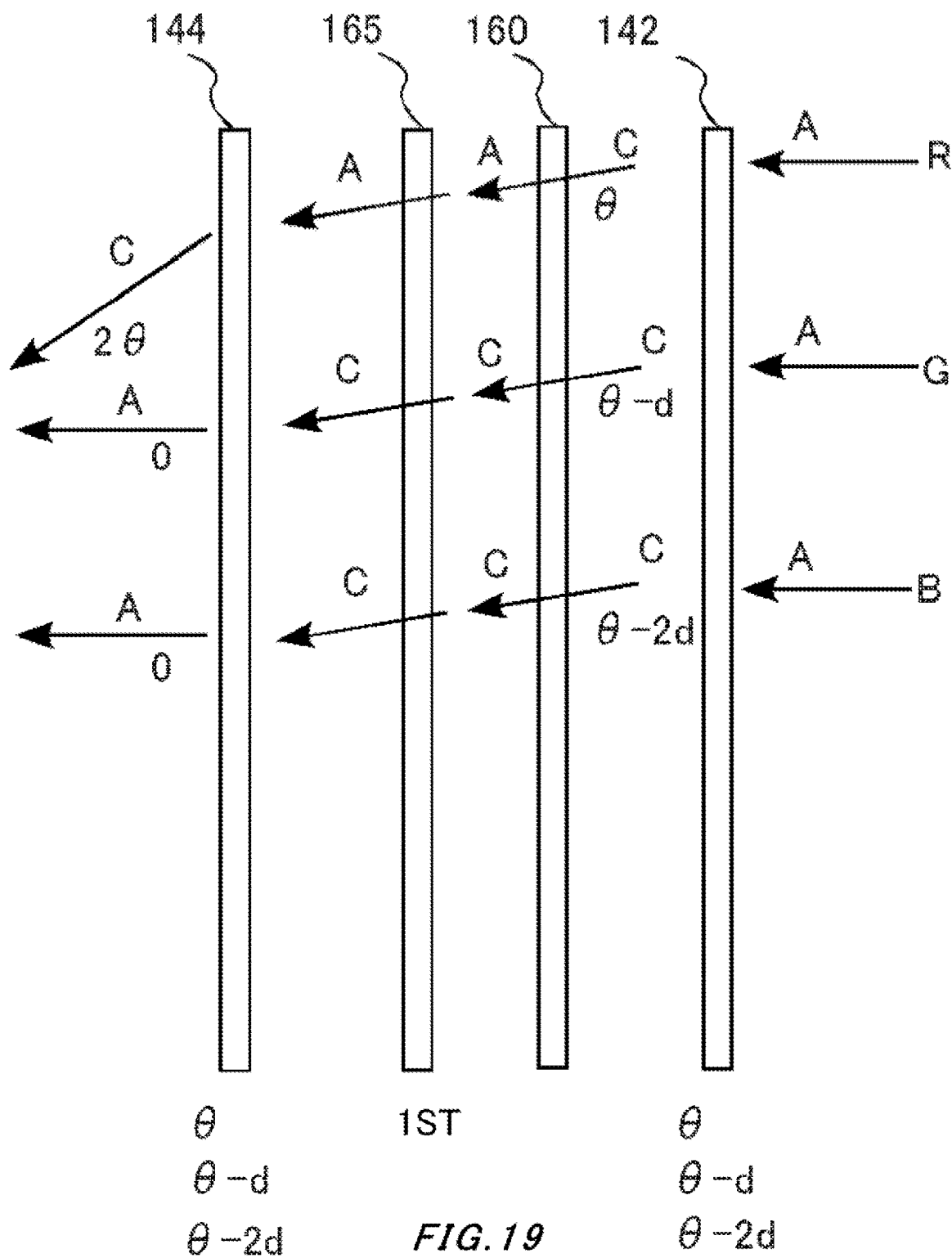
FIG. 19 is a diagram illustrating a first state of a GPH unit 157.
Figure 20:
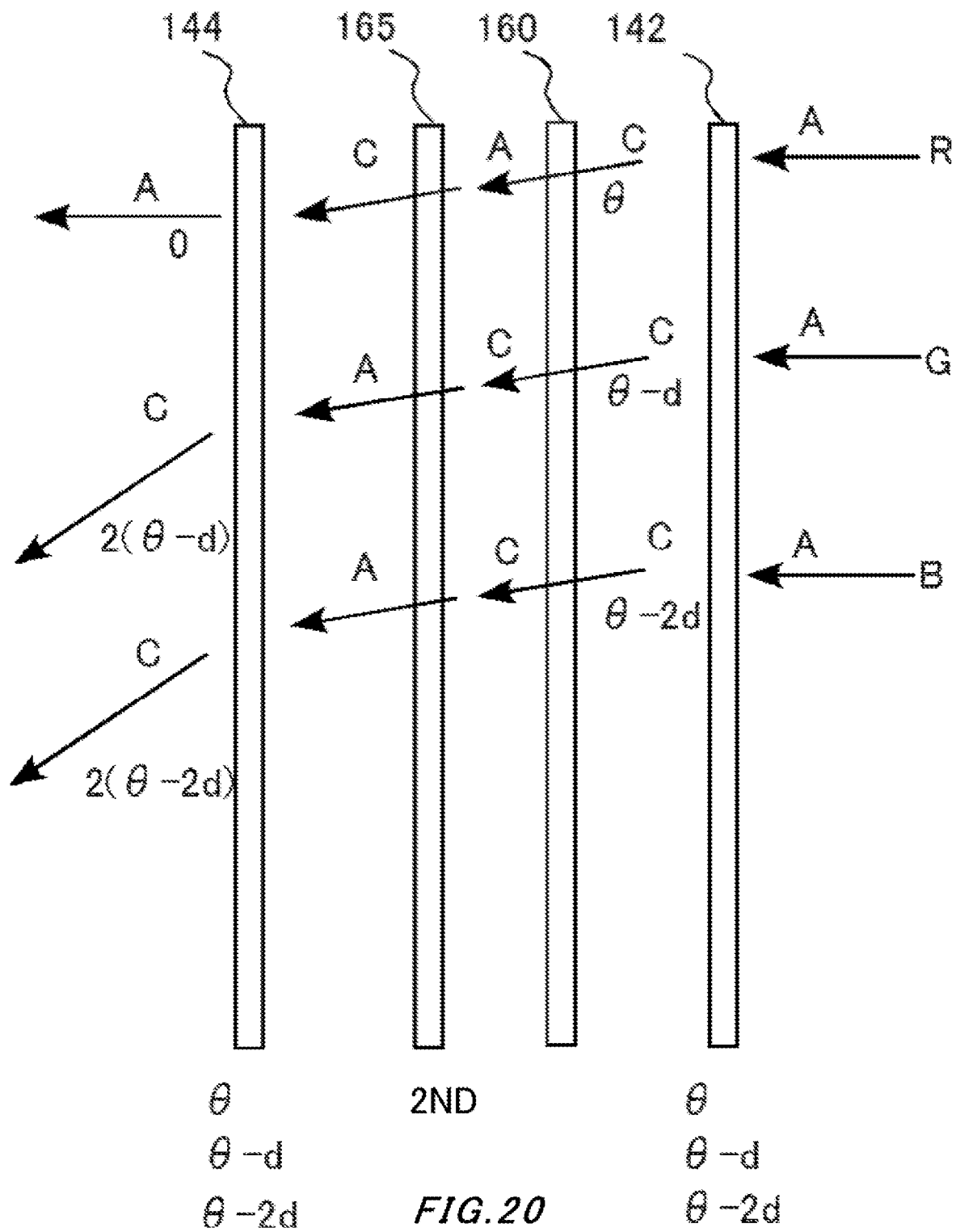
FIG. 20 is a diagram illustrating a second state of the GPH unit 157.

FIG. 19 and FIG. 20 are diagrams illustrating a GPH unit 157 that is a modification example of the GPH unit 140 in FIG. 7. In the GPH unit 157, the same configuration as that of the GPH unit 140 is given the same reference numeral, and the description is omitted.

The GPH unit 157 is different from the GPH unit 140 in that, between the polarization conversion element 160 and the GPH element 144, the polarization switch element 165 is provided. The polarization switch element 165 can switch the states between a first state where the polarization state of the entering light is, regardless of the wavelength of the light, kept unchanged and output; and a second state where the polarization state of the entering light is converted into an inverted polarization state and resultant light is output. In either state, the polarization switch element 165 outputs the light, without deflecting the direction of the ray of the entering light, that is, keeping the light unchanged. Examples of the polarization switch element 165 includes an element where a liquid crystal panel whose first state and second state are switched according to the voltage is sandwiched with λ/4 plates in a direction such that slow axes thereof intersect each other.

FIG. 19 illustrates that the polarization switch element 165 is in the first state, and thereby, the GPH unit 157 is in the first state. When the polarization switch element 165 includes a liquid crystal panel as the example described above, the first state, for example, is a state where voltage is applied on the liquid crystal panel.

In the first state, the polarization switch element 165 outputs the light, keeping the polarization state of the entering light unchanged. Thus, in the first state, the GPH unit 157 has the same optical function as that of the GPH unit 140, regardless of the presence of the polarization switch element 165.

FIG. 20 illustrates that the polarization switch element 165 is in the second state, and thereby, the GPH unit 157 is in the second state. When the polarization switch element 165 includes a liquid crystal panel, the second state, for example, is a state where no voltage is applied on the liquid crystal panel.

In the second state, the polarization switch element 165, regardless of the wavelength, outputs the light, converting the polarization state of the entering light into an inverted direction. In the example in FIG. 20, red (R) is converted from the left-handed circularly polarized light into right-handed circularly polarized light, and green (G) and blue (B) are converted from the right-handed circularly polarized light into left-handed circularly polarized light. Thereby, in the second state, the GPH unit 157 emits the lights of RGB in a polarization state and a deflection direction that are different from those in the first state.

According to the GPH unit 157 having the configuration described above, by switching the state of the polarization switch element 165, wavelength dispersibility that is generated in the optical apparatus 10 as a whole can be switched. Note that, when the linearly polarized light is input to the polarization switch element 165, and the second state where the polarization state is inverted corresponds outputting linearly polarized light orthogonal to the input linearly polarized light.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. An optical apparatus to overlay image light on external light and guide resultant light in a downstream side, the optical apparatus comprising:
    an image optical system including an optical element having lens power with respect to at least the image light; and
    a reflecting element to overlay, by reflecting at least part of the image light, the at least part of the image light and the at least part of the external light, wherein
    the image optical system further includes a GPH (geometric-phase hologram) element having inverse dispersibility that is inverse to wavelength dispersibility of the optical element, and
    the image optical system further includes a polarization conversion element that is provided overlapping the GPH element, and inverts a direction of a polarization state of a particular wavelength band of entering light and keeps uninverted a direction of a polarization state of other wavelengths of the entering light.

2. The optical apparatus according to claim 1, wherein the reflecting element comprises:
    a light guide plate that totally reflects the image light entered therein;
    a first deflection element to deflect a first direction of the image light having entered the light guide plate into a second direction such that total reflection of the image light occurs inside the light guide plate; and
    a second deflection element to overlay, by reflecting at least part of the image light in the light guide plate, the at least part of the image light and at least part of the external light.

3. The optical apparatus according to claim 2, wherein the first deflection element is a half mirror.

4. The optical apparatus according to claim 2, wherein the second deflection element is a polarizing beam splitter to reflect a first polarization component of the image light and transmit a second polarization component of the external light.

5. The optical apparatus according to claim 2, wherein the GPH element has the inverse dispersibility to compensate at least part of wavelength dispersibility of the image optical system that is provided in an upstream side of the reflecting element with respect to the image light.

6. The optical apparatus according to claim 2, further comprising an external light adjusting unit that is provided in an upstream side of the reflecting element with respect to the external light, and can adjust strength of external light to be transmitted.

7. The optical apparatus according to claim 2 for augmented reality, being worn by a user, and overlaying the image light on the external light and guiding resultant light to eyes of the user.

8. The optical apparatus according to claim 2, wherein at least one of the first deflection element and the second deflection element is a mirror.

9. The optical apparatus according to claim 2, wherein at least one of the first deflection element and the second deflection element is a half-mirror.

10. The optical apparatus according to claim 2, wherein at least one of the first deflection element and the second deflection element is a diffraction element.

11. The optical apparatus according to claim 2, wherein at least one of the first deflection element and the second deflection element is a hologram.

12. The optical apparatus according to claim 1, further comprising a polarization switch element that is provided between the polarization conversion element and the GPH element, and switches states between a first state where a polarization state of entering light is kept unchanged and output; and a second state where a polarization state of entering light is converted into an inverted polarization state and resultant light is output.

13. The optical apparatus according to claim 1, wherein the optical apparatus further comprises:
a combinational effect of the polarization conversion element and the GPH splits a diffraction angle of light after passing through the GPH into opposite directions depending on the wavelength of the light, and
the GPH element has a first order diffraction angle $\ominus$ of emitted first direction circularly polarized light when second direction circularly polarized light enters, the second direction being opposite the first direction, and a first order diffraction angle $\ominus$ of emitted second direction circularly polarized light when first direction circularly polarized light enters.

14. An optical apparatus to overlay image light on external light and guide resultant light in a downstream side, the optical apparatus comprising:
an image optical system including an optical element having lens power with respect to at least the image light; and
a reflecting element to overlay, by reflecting at least part of the image light, the at least part of the image light and the at least part of the external light, wherein
the image optical system has a GPH (geometric-phase hologram) element having inverse dispersibility that is inverse to wavelength dispersibility of the optical element,
the optical element has a reflection type optical system which is provided in a downstream side of the reflecting element and configured of a plurality of optical members that fit each other on a fitting surface and refractive indexes of the plurality of optical members coincide each other within a predetermined range, the reflection type optical system having a curved surface to transmit part of entering light and reflect other part of the entering light, and
the optical apparatus further comprises:
a 1/4-wavelength plate that is provided in a downstream side of the reflection type optical system; and
a reflection type polarizing plate that is provided in a downstream side of the 1/4-wavelength plate, and reflects first linearly polarized light and transmits second linearly polarized light,
the GPH element has the inverse dispersibility to compensate wavelength dispersibility of at least the reflection type optical system.

* * * * *